(12) United States Patent
Anfang et al.

(10) Patent No.: US 9,149,756 B2
(45) Date of Patent: Oct. 6, 2015

(54) DEVICE FOR THE ADSORPTION TREATMENT OF A FLUID OR FLUID STREAM

(75) Inventors: Hans-Georg Anfang, Vagen (DE); Christian Hamel, Ellingen (DE); Norbert Modl, Bad Aibling (DE)

(73) Assignee: Clariant Produkte (Deutschland) GmbH, Frankfurt/Main (DE)

( * ) Notice: Subject to any disclaimer, the term of this patent is extended or adjusted under 35 U.S.C. 154(b) by 0 days.

(21) Appl. No.: 13/640,861

(22) PCT Filed: Apr. 13, 2011

(86) PCT No.: PCT/EP2011/055785
§ 371 (c)(1),
(2), (4) Date: Dec. 13, 2012

(87) PCT Pub. No.: WO2011/128363
PCT Pub. Date: Oct. 20, 2011

(65) Prior Publication Data
US 2013/0074689 A1    Mar. 28, 2013

(30) Foreign Application Priority Data

Apr. 14, 2010  (DE) .................. 10 2010 014 890
Apr. 14, 2010  (DE) .................. 20 2010 014 363 U
Apr. 14, 2010  (DE) .................. 20 2010 016 522 U

(51) Int. Cl.
*B01D 53/04*    (2006.01)
*H01M 8/06*    (2006.01)
(Continued)

(52) U.S. Cl.
CPC ............ *B01D 53/02* (2013.01); *B01D 53/0415* (2013.01); *B01D 53/0446* (2013.01);
(Continued)

(58) Field of Classification Search
CPC ............... B01D 52/02; B01D 52/0415; B01D 52/0423; B01D 52/0446; B01D 2256/24; B01D 2257/30; B01D 2259/40084; B01D 2259/40086; B01D 2259/401; F16L 36/60; H01M 8/0675; Y02E 60/50
USPC ............ 96/108, 111, 143, 147, 151; 95/8, 11, 95/135–137, 148; 210/660, 670, 282; 585/820; 429/408, 410; 208/208 R; 423/244.02
See application file for complete search history.

(56) References Cited

U.S. PATENT DOCUMENTS 4,741,697 A * 5/1988 Herbison .................. 433/25
4,966,550 A * 10/1990 Privat ..................... 433/25
(Continued)

FOREIGN PATENT DOCUMENTS

DE         831 472           7/1949
DE    10 2007 025 808 B3    10/2008
(Continued)

OTHER PUBLICATIONS

International Search Report PCT/EP2011/055785 dated Jul. 4, 2011.
(Continued)

*Primary Examiner* — Frank Lawrence
(74) *Attorney, Agent, or Firm* — Anthony A. Bisulca

(57) ABSTRACT

A device for adsorption treatment of a fluid or fluid stream, comprising a container for receiving adsorber material, wherein the container has a fluid inlet opening and a fluid outlet opening, and two fluid connection devices, wherein one of the fluid connection devices is provided at the fluid inlet opening and the other one of the fluid connection devices is provided at the fluid outlet opening, wherein the fluid connection devices are locked in a fluid-tight manner and are designed in such a way that they can each be connected to a fluid line connector and unlocked and, if they are connected to the respective fluid line connector they can be unlocked or are unlocked.

23 Claims, 11 Drawing Sheets

(51) Int. Cl.
   *B01D 53/02* (2006.01)
   *F16L 37/60* (2006.01)

(52) U.S. Cl.
   CPC .............. *F16L37/60* (2013.01); *H01M 8/0675* (2013.01); *B01D 53/0423* (2013.01); *B01D 2256/24* (2013.01); *B01D 2257/30* (2013.01); *B01D 2259/401* (2013.01); *B01D 2259/40084* (2013.01); *B01D 2259/40086* (2013.01); *Y02E 60/50* (2013.01)

(56) References Cited

U.S. PATENT DOCUMENTS

| | | | | |
|---|---|---|---|---|
| 5,139,747 | A | * | 8/1992 | Cato et al. .................. 422/122 |
| 5,558,688 | A | * | 9/1996 | Cowan et al. ................ 55/312 |
| 5,611,923 | A | * | 3/1997 | Suri et al. .................. 210/238 |
| 6,652,749 | B2 | * | 11/2003 | Stankowski et al. .......... 210/232 |
| 7,364,603 | B2 | * | 4/2008 | Sweeney et al. ............. 95/133 |
| 7,608,136 | B2 | * | 10/2009 | van der Maas .............. 96/117.5 |
| 8,252,081 | B2 | * | 8/2012 | Roth et al. .................. 55/498 |
| 2009/0272675 | A1 | | 11/2009 | Ratnasamy et al. |
| 2010/0136439 | A1 | * | 6/2010 | Ukai et al. .................. 429/410 |
| 2011/0200507 | A1 | | 8/2011 | Steiner et al. |

FOREIGN PATENT DOCUMENTS

| | | |
|---|---|---|
| WO | WO 2004/060840 A2 | 7/2004 |
| WO | WO 2006/028686 A1 | 3/2006 |
| WO | WO 2009/092983 A1 | 7/2009 |
| WO | WO 2010/023249 A1 | 3/2010 |

OTHER PUBLICATIONS

DVGW-TRGI Worksheet G600 of Apr. 2008, pp. 1-67.

* cited by examiner

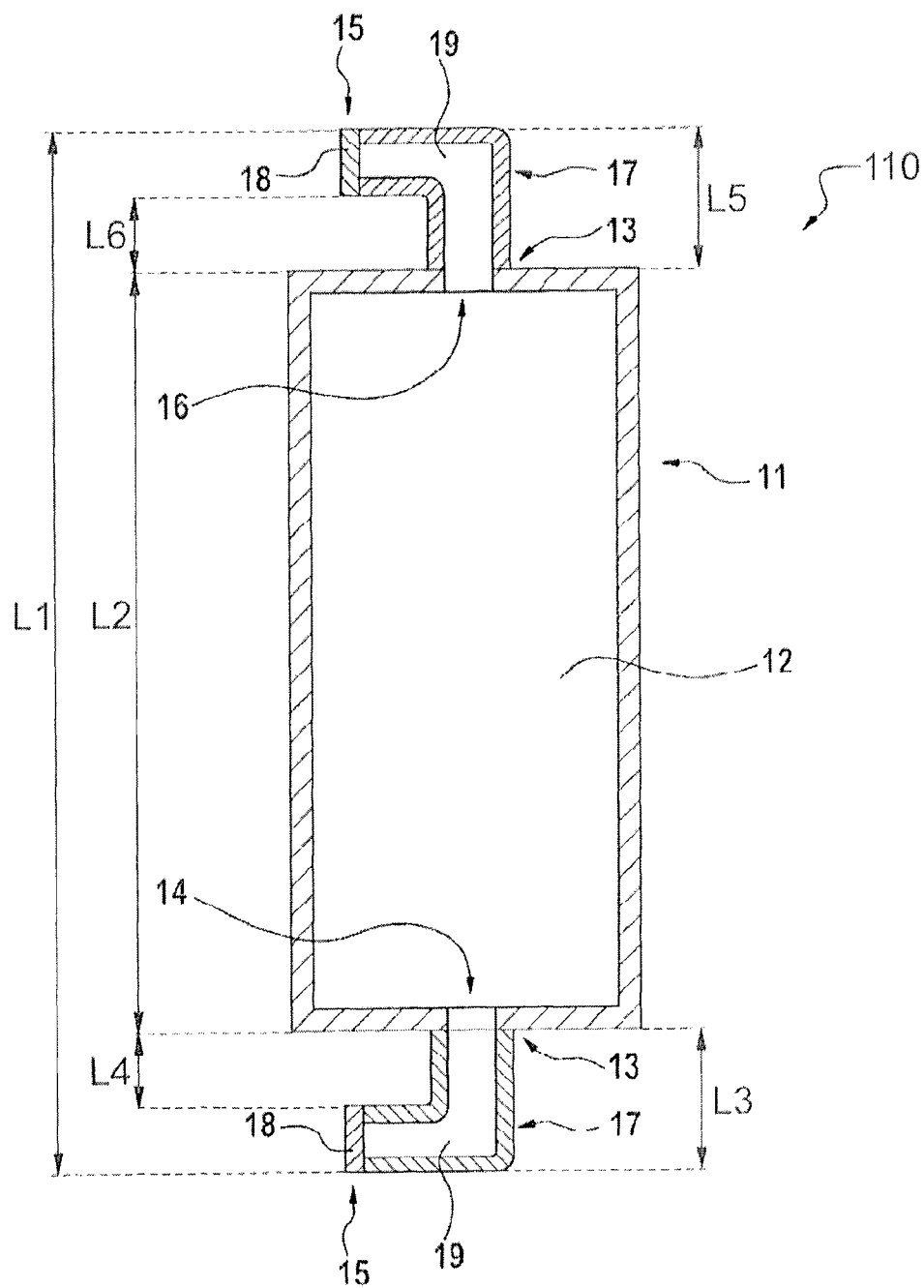

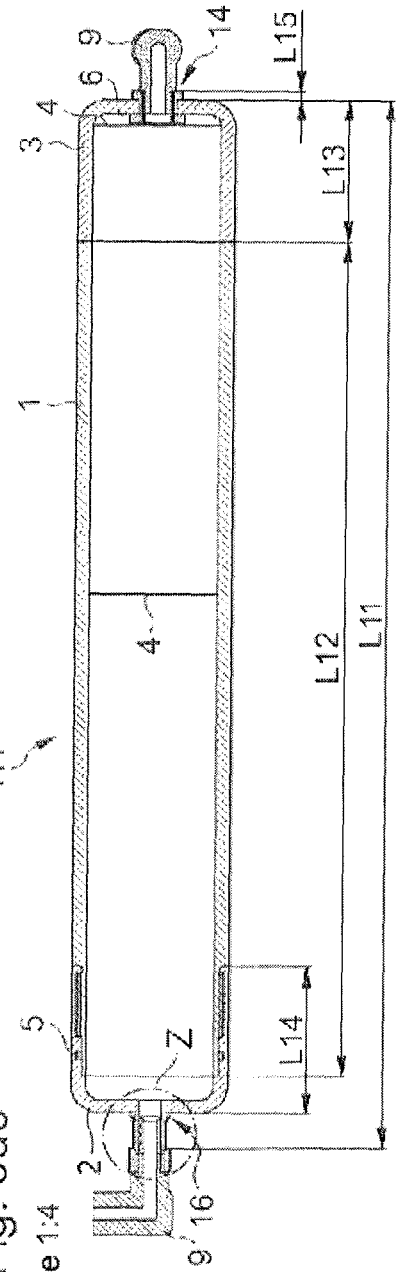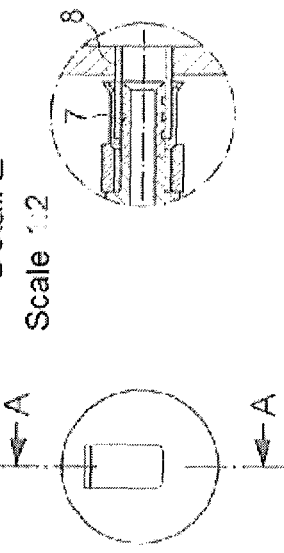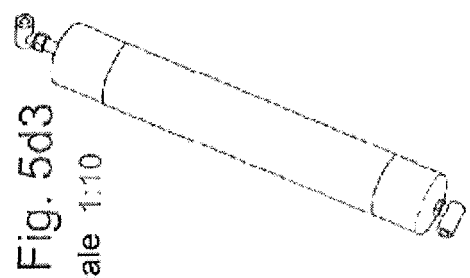

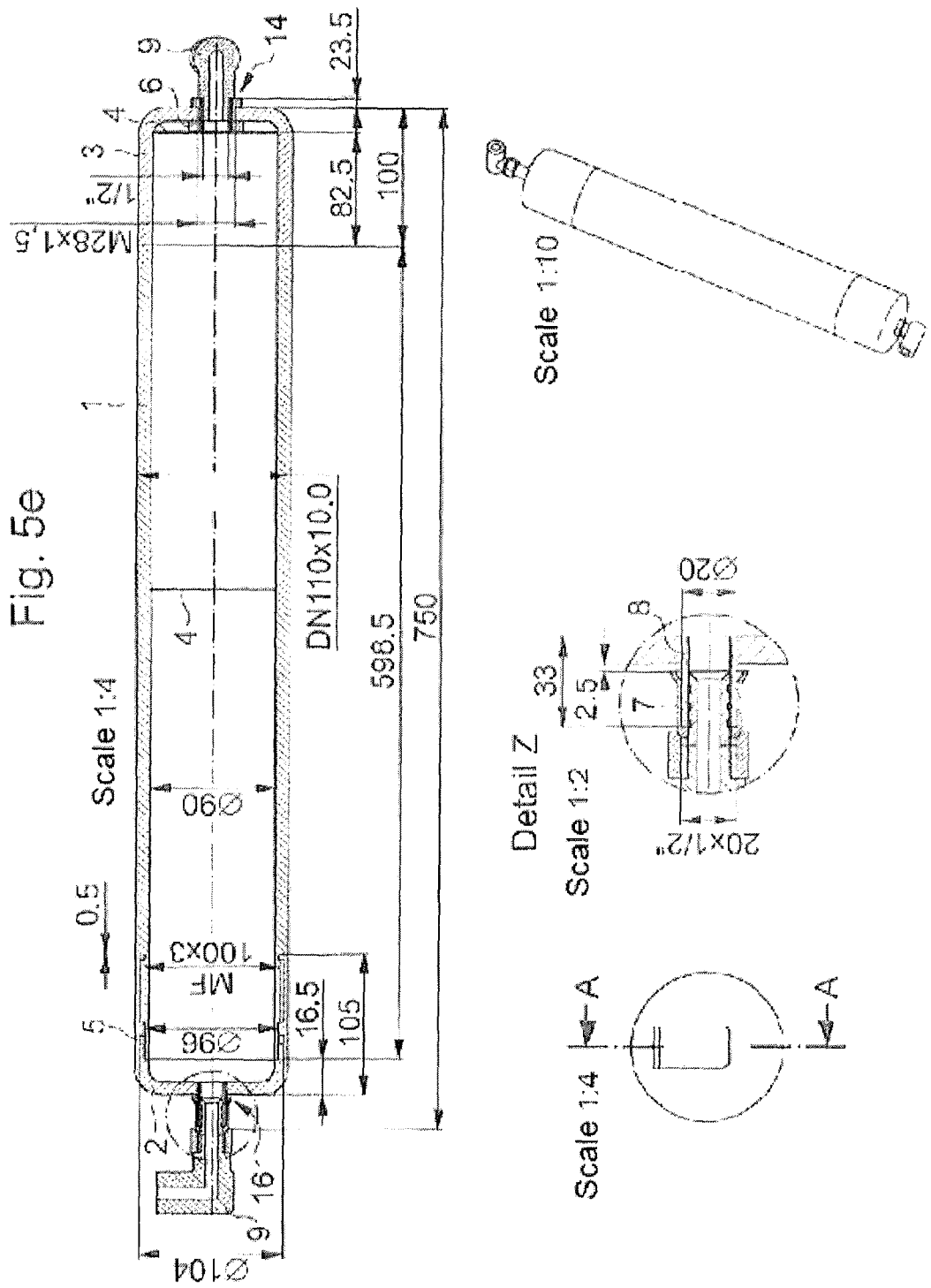

|  | 2 | 3.9 | 7.4 |
|---|---|---|---|
| #10000 | 100% | 104% | 111% |
| #5000 | 111% | 113% | 119% |
| #3000 | 109% | 117% | 124% |

DEVICE FOR THE ADSORPTION TREATMENT OF A FLUID OR FLUID STREAM

CROSS-REFERENCE TO RELATED APPLICATIONS

This application is a U.S. National Stage application claiming benefit of International Application No. PCT/EP2011/055785, filed Apr. 13, 2011, and claiming benefit of German Application Nos. DE 10 2010 014 363.2, filed Apr. 14, 2010, DE 20 2010 016 522.9, filed Apr. 14, 2010 and DE 10 2010 014 890.3, filed Apr. 14, 2010. The entire disclosures of PCT/EP2011/055785, DE 10 2010 014 363.2, DE 20 2010 016 522.9 and DE 10 2010 014 890.3 are all incorporated herein by reference.

BACKGROUND

The present invention relates to a device for the adsorption treatment of a fluid or fluid stream, a use of a device for the adsorption treatment of a fluid or fluid stream, a method for regenerating and/or disposing of, filling and/or installing a device for the adsorption treatment of a fluid or fluid stream and a method for the adsorption treatment of a fluid or fluid stream, in particular natural gas or liquefied gas for fuel cells. The invention relates in particular to a device for desulfurizing a gaseous hydrocarbon stream and a corresponding method, in particular for use in combination with a fuel cell apparatus.

Most fuel cells require hydrogen or hydrogen-rich gases as fuel for producing heat and power. Therefore, significant efforts are currently being made to produce hydrogen from logistic fuels such as diesel, gasoline, naphtha, liquefied gas and natural gas in catalytic fuel-conversion systems. However, in the long term, the successful use of fuel cells depends on the availability of regeneratively-produced hydrogen.

The catalytic conversion of liquid or gaseous hydrocarbons to obtain a hydrogen-rich gas such as the so-called reformate gas takes place in several series-connected steps: the actual reforming reaction, a downstream water-gas shift reaction as well as possibly a CO fine purification reaction such as e.g. the selective CO methanation reaction.

However, most of the primary energy carriers which come into question for the catalytic production of hydrogen contain sulfur. These are sometimes added to the fuel intentionally as so-called odorants to warn people of possible leaks. Odorization serves as a safety measure when using otherwise odourless gases and denotes the addition of odoriferous substances (odorants) which are to have a smell typical of the danger. People associate odorants with alerts, even when the latter are highly diluted. Therefore, in addition to naturally occurring sulfur compounds such as $H_2$ and COS, liquefied gas and natural gas typically contain sulfur-containing odorants such as tetrahydrothiophene (THT) or mercaptans or mixtures of methanethiol, ethanethiol, 1-propanethiol and 2-methyl-2-propanethiol, and tert-butylmercaptan (TBM).

However, it is known that sulfur compounds cause irreversible deactivations in reforming catalysts and in the actual fuel cells. A suitable desulfurization stage is therefore a prerequisite for using hydrocarbons as fuel in a fuel cell. The process-engineering conversions involved in the desulfurization differ greatly depending on the hydrocarbon used. To desulfurize natural gas and liquefied gas, the simplest possible adsorptive desulfurization stages are sought, which can be operated with the highest possible selectivity at room temperature and ambient pressure.

Adsorptive desulfurization methods with solid adsorbents are used in many fuel cell applications and are relatively simple to realize in terms of process requirements, e.g. room temperature and ambient pressure. For example WO 2010/023249 A1 describes an adsorber material and a method for desulfurizing hydrocarbon-containing gases. However, on the other hand, low temperatures and reaction pressures mean comparatively low sulfur-absorption capacities. The consequence is relatively large adsorber beds or rapid replacement intervals. The capacity of the respective adsorbent depends greatly on the composition of the hydrocarbon as well as on the concentration and type of the sulfur compounds. The materials used are e.g. standard and impregnated activated charcoals, zeolite systems, metal and mixed-metal (oxide) catalysts, clay minerals as well as combinations of the materials in mixed bed and multi-component systems.

There is a demand for devices for adsorption treatment, e.g. detoxifying, of fluids or fluid streams, or for desulfurizing hydrocarbons for fuel cells, which make possible the safety-relevant measures and functionalities when installing or removing the devices in or from the gas line. The safe installation or safe replacement of the device is a central question for a logistical plan for equipping and retrofitting e.g. fuel-cell systems with sulfur filter systems.

The transport of spent desulfurizing cartridges represents one of the most important challenges to be met when constructing a logistical concept for supplying and disposing of desulfurizing cartridges for fuel cells. Filters are generally replaced by service engineers or gas engineers, most of whom have received no special training in dealing with hazardous materials. For this reason, among others, desulfurizing adsorbents are developed which are not classified as hazardous materials. After use, however, depending on the material and according to the accompanying gas substances of the gas to be desulfurized, various other toxic gas constituents in addition to sulfur compounds can accumulate in the adsorbents and thus change their properties.

For this reason, there can be no generally valid classification of the adsorbent in a spent desulfurizing cartridge. Depending on the adsorbent and gas composition, in addition to the sulfur compounds, various other substances may or may not be adsorbed. To protect people from possible exposure it must be ensured that the spent adsorbent is replaced by arranging for only people with expertise and safety equipment to replace the cartridge. Therefore there is a demand for safe devices for adsorption treatment, e.g. devices for the desulfurization of gaseous hydrocarbons.

SUMMARY

The object of the invention is to provide a safe device for the adsorption treatment of a fluid in which the connection to a fluid line, the regeneration and/or disposal of the adsorbent and the replacement of the device takes place as simply and safely as possible, and the operation of the device is highly reliable.

In an embodiment, a device for the adsorption treatment of a fluid or fluid stream is provided, comprising a container for receiving adsorber material, wherein the container has a fluid inlet and a fluid outlet, and two fluid connection devices, wherein one of the fluid connection devices is provided at the fluid inlet and the other fluid connection device is provided at the fluid outlet, wherein the fluid connection devices are locked fluid-tight and formed such that they can each be connected to a fluid line connection piece and unlocked and on condition that they are connected to the respective fluid line connection piece, can be or are unlocked.

One embodiment relates to the use of a device for the adsorption treatment of a fluid or fluid stream according to the previous embodiment for desulfurizing a combustion fluid, in particular natural gas or liquefied gas, for fuel cells.

In a further embodiment a method for regenerating and/or disposing of, filling and/or installing a device for the adsorption treatment of a fluid or fluid stream according to the above-mentioned embodiment is provided, comprising at least one of the steps: removing the device for the adsorption treatment of a fluid or fluid stream, the container of which contains adsorber material to be regenerated and/or disposed of, from an apparatus at or in which an adsorption treatment has been carried out, by detaching the fluid connection devices from the fluid line connection pieces which are connected to the apparatus; transporting the container with the adsorber material to be regenerated and/or disposed of and locked fluid line connection pieces while the container is filled with fluid which has been treated or is to be treated; transporting the container with the adsorber material to be regenerated and/or disposed of and locked fluid connection devices to a regeneration and/or disposal station; flushing the container which contains adsorber material to be regenerated and/or disposed of, with gas, protective gas, inert fluid, inert gas or air; emptying the container of the adsorber material to be regenerated and/or disposed of; regenerating and/or disposing of the adsorber material to be regenerated and/or disposed of; filling the container with regenerated or unused adsorber material; flushing the container with protective gas, inert fluid, inert gas or the fluid which no longer contains an adsorbate to be removed by the adsorption treatment, during and/or after filling the container with the regenerated or unused adsorber material; carrying out a pressure and/or leak test to check the tightness of the filled container with locked fluid connection devices; transporting the container with the regenerated or unused adsorber material and locked fluid connection devices while the container is filled with protective gas, inert fluid or inert gas; transporting the container with the regenerated or unused adsorber material and locked fluid connection devices to an apparatus at or in which an adsorption treatment is to be carried out; connecting fluid line connection pieces to the apparatus at or in which an adsorption treatment is to be carried out; installing the device for the adsorption treatment of a fluid or fluid stream at or in an apparatus at or in which an adsorption treatment is to be carried out while the container is filled with regenerated or unused adsorber material and an element selected from protective gas, inert fluid, inert gas or the fluid which no longer contains an adsorbate to be removed by the adsorption treatment by connecting the fluid connection devices to fluid line connection pieces which are connected to the apparatus.

In a further embodiment a method is provided for the adsorption treatment of a fluid or fluid stream, in particular for desulfurizing natural gas or liquefied gas for fuel cells, comprising: providing a device for the adsorption treatment of a fluid or fluid stream according to the above-mentioned embodiment, wherein the container has been or is filled with an adsorber material for the adsorption treatment of fluids, connecting a fluid feed pipe to a first fluid line connection piece and a fluid drainage pipe to a second fluid line connection piece, connecting the first and second fluid line connection piece to the two fluid connection devices of the device for the adsorption treatment of a fluid or fluid stream and thereby unlocking the fluid connection devices and introducing a fluid in or passing a fluid through the device for the adsorption treatment of the fluid.

Further features and advantages result from the following description of embodiments, the figures and the dependent claims.

All non-mutually exclusive features of embodiments described here can be combined with one another. Identical elements of the embodiments are given identical reference numbers in the following description. Elements of one embodiment can be used in the other embodiments without further mention. Embodiments of the invention will now be described in more detail in the following examples with reference to figures, without wishing to thereby limit them. There are shown in:

BRIEF DESCRIPTION OF THE DRAWINGS

FIG. 5c a schematic representation of a device according to an embodiment;

FIG. 5d schematic representations (FIGS. 5d0 to 5d3) of a device according to an embodiment;

FIG. 5e representations of an example of a device according to the embodiment of FIG. 5d.

DETAILED DESCRIPTION

Figure 1:
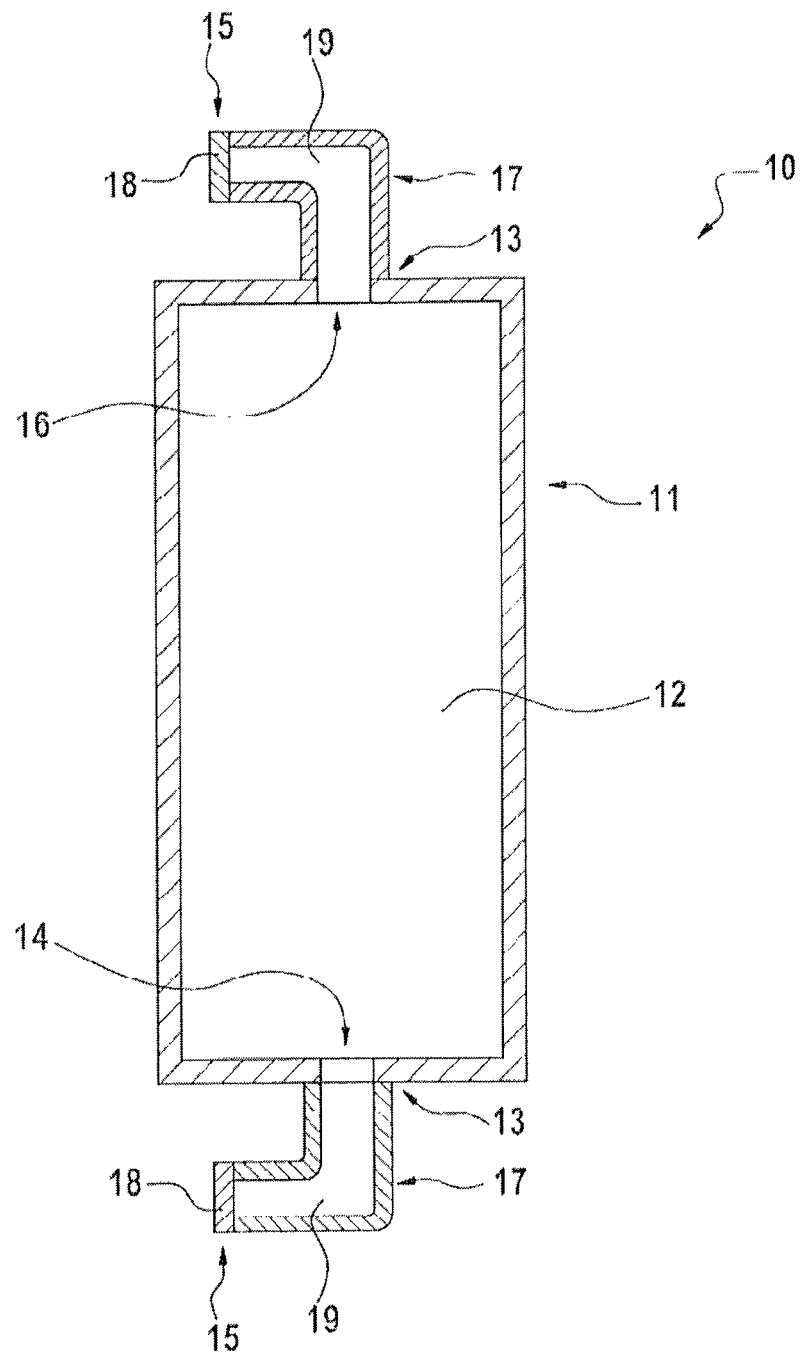
FIG. 1 a schematic representation of a device according to an embodiment.

In the following description of embodiments the terms adsorber, adsorbent, sorbent and adsorber material are used synonymously. Furthermore, the device for the adsorption treatment of a fluid or fluid stream is also called a cartridge hereafter. The fluid connection devices are described below using, but not limited to, gas connectors with a shape bent at a 90° angle, but not limited to same.

Moreover, embodiments of the invention are described below using desulfurization of a fuel gas for fuel cells without limiting the invention to same. Moreover, in the following description of the embodiments, a gas is used as fluid without limiting the invention to same. Furthermore, embodiments of the invention are described below in connection with the adsorbate treatment of a fluid stream but can also be used for treating a stationary fluid.

In an embodiment, a device for the adsorption treatment of a fluid or fluid stream is provided, comprising a container for receiving adsorber material, wherein the container has a fluid inlet and a fluid outlet, and two fluid connection devices, wherein one of the fluid connection devices is provided at the fluid inlet and the other fluid connection device is provided at the fluid outlet, wherein the fluid connection devices are locked fluid-tight and formed such that they can each be connected to a fluid line connection piece and unlocked and on condition that they are connected to the respective fluid line connection piece, can be or are unlocked. The fluid connection devices can also be formed such that, provided they are not connected to the respective fluid line connection piece, they are locked fluid-tight.

The device for the adsorption treatment of a fluid or fluid stream can be used for desulfurizing a combustible fluid, in particular natural gas or liquefied gas, for fuel cells. The device can also be equipped with only one fluid connection device. Here, the device for the adsorption treatment of a fluid or fluid stream is also called device for adsorption treatment or device.

Embodiments according to the invention make possible an adsorption treatment of fluids with an intrinsically safe device, e.g. for desulfurizing hydrocarbons, which is closed gas-tight after removal from the gas line. For example the intrinsically safe device locks automatically, conditioned by its function, when removed manually from the gas line. Exposure to pollutants as well as the escape of combustible gases is thus reliably prevented. The device according to embodiments can, after removal, be sent to a disposal company, opened by trained persons and the adsorber fed to the appropriate reprocessing or disposal unit before the device is refilled with new material and can be recycled.

In embodiments, the unlocked fluid connection devices can secure the fluid line connection pieces, e.g. against undesirable detachment. Furthermore, the fluid connection devices can be formed such that the fluid line connection pieces can be secured when the fluid connection devices are unlocked. Moreover, the fluid connection devices can be formed such that they can be manually or automatically locked by means of the respective fluid line connection pieces, e.g. by actuating or detaching the respective fluid line connection pieces. In embodiments, at least one of the fluid connection devices is formed such that it can successively or simultaneously be connected to the respective fluid line connection piece and can be unlocked.

FIG. 1 shows a cartridge 10 as an example of one embodiment of the device for the adsorption treatment. The cartridge 10 comprises a container 11, the walls of which consist of a material, e.g. high-grade steel, which makes the inside 12 of the container suitable for the air-tight absorption of gases. The container can for example be made of plastic or metal, particularly preferred materials are PE (polyethylene) e.g. PE 80, PE 100, PE-Xa, PE-Xb, PE-Xc, aluminium, anodized aluminium, high-grade steel, copper, or other materials authorized for natural gas. A combination of the named materials is likewise conceivable.

As fluid inlet the container 11 has an inlet opening 14 and as fluid outlet an outlet opening 16. A gas connector 17 is attached gas-tight as fluid connection device to each of the openings 14 and 16. The gas connectors 17 each have a fluid throughflow duct 19 and can be soldered to one end 13 of the container 11 or removably connected, gas-tight, to the container 11, e.g. by means of a gas-tight thread, not shown in FIG. 1. The gas connectors 17 are locked, gas-tight, at the respective other end 15 facing away from the container 11, unconnected there, which is shown schematically in FIG. 1 and by way of example with locking bars 18 as closure bodies. The gas connectors 17 are formed such that each can be connected and unlocked at the end 15 with a gas pipe 20 as fluid line connection piece and on the condition that they are connected to the respective gas pipe 20, but unlocked. Alternatively the gas connectors 17 can be formed such that they can be unlocked on the condition that they are connected to the respective gas pipe 20.

In embodiments, the fluid connection devices can be welded and/or glued onto the container 11. This makes it impossible to dismantle the safe fluid connection device without destroying it.

In an embodiment of the device, the fluid connection devices each have a fluid throughflow duct and a movable closure body, wherein the closure body closes the fluid throughflow duct fluid-tight and the fluid connection devices are formed such that the respective closure body is moved by connecting the fluid connection device to the fluid line connection piece and opens the fluid throughflow duct, and/or is moved by detaching the fluid line connection piece and closes the fluid throughflow duct. The closure body can be pretensioned such that, if the fluid connection device is not coupled to a corresponding fluid line connection piece, the fluid connection device is locked, and if the fluid line connection piece is detached, it is automatically locked.

Figure 2:
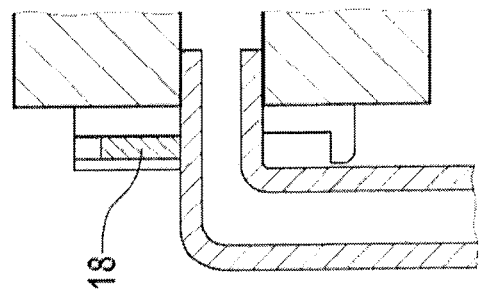
FIG. 2 a schematic representation of a device according to an embodiment.
Figure 2:
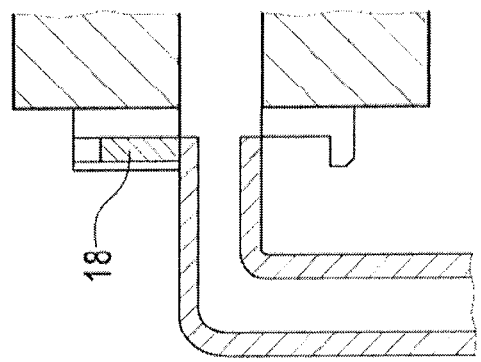
Figure 2:
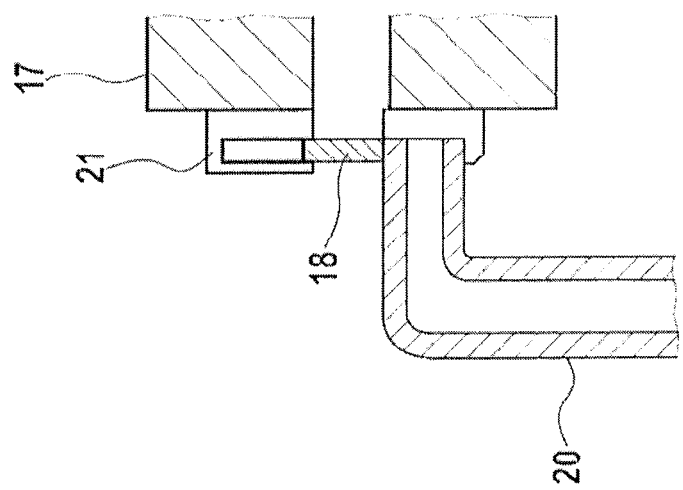

FIG. 2 shows, schematically, an embodiment of the gas connector 17 and the gas pipe 20, wherein the representations in FIG. 2 illustrate, from left to right, the process of connecting the gas pipe 20 to the gas connector 17. In this embodiment, if it is not connected to the gas pipe 20, the end 15 of the gas connector 17 is closed, gas-tight, by the locking bar 18 displaceable by the gas connector 17. The displaceable locking bar 18 is pretensioned within a locking apparatus 21, for example with a spring (not shown), and housed displaceable as far as a stop point. The locking bar 18 is pretensioned such that, if no gas pipe 20 is connected to the gas connector 17, it closes gas-tight the opening of the end 15 facing away from the container 11 of the gas pipe 20. In order to connect the gas pipe 20 to the gas connector 17, in this embodiment firstly the gas pipe 20 is inserted into an opening of the locking apparatus next to the lock 18 (left-hand diagram in FIG. 2). The gas pipe 20 is then moved in front of the end 15 of the gas pipe 17 such that the locking bar 18 is pushed to its stop point and the opening of the gas pipe is exposed and aligned with the gas pipe (middle diagram in FIG. 2). Finally, the gas pipe 20 is pushed forward into the throughflow duct 19 of the gas pipe and a gas-tight connection of the gas pipe 20 to the gas connector 17 is produced (right-hand diagram in FIG. 2). To secure the gas pipe 20 against being pulled out, the pretensioned locking bar 18 can lock into a corresponding groove (not shown) at the gas pipe. In the present embodiment, the gas connectors 17 are formed such that they are unlocked on the condition that they are connected to the respective gas connector 20. To detach the gas pipe 20 this is pulled out of the gas connector 17, the pretensioned locking bar 18 is again pushed in front of the opening of the gas connector, whereby the gas connector automatically locks gas-tight.

In other embodiments a shutoff valve, e.g. a ball valve, a tap cock or a piston valve, can be integrated into the end 15 of the gas connector 17 facing away from the container 11, wherein correspondingly a ball, a plug or a piston serve as movable closure body.

According to an embodiment (not shown), at least one gas connector 17 and the associated gas pipe are designed as combined plug-in and rotary coupling, wherein the plug-in and rotary coupling has an internal ball valve, closed when uncoupled and opened when coupled. In an example (not shown), the gas pipe has a internal coupling piece and the gas connector an external coupling piece as plug-in coupling parts. The plug-in and rotary coupling also comprises a ball valve as rotary coupling part in the end 15 of the gas connector 17. The ball valve and the internal and external coupling pieces are designed such that the ball valve is opened by rotating the internal coupling piece of the gas pipe in the external coupling piece of the gas connector 17, and the gas connector 17 is thus unlocked.

Additionally, in the present example, the plug-in and rotary coupling is designed such that the gas pipe is secured at the gas connector during rotation. For example, during rotation, a pretensioned pin at the gas pipe can lock into a recess in the gas connector in order to secure the gas pipe against undesired detachment at the gas connector. This pin can only be released again from the recess by a combined rotary and pushing movement.

In the present example there is also provided at the internal coupling piece of the gas pipe a groove in which a corresponding projection, provided in the gas connector, can engage when introducing the gas pipe. Additionally, the gas pipe is provided with a red and a green marking. The gas connector has an observation port which corresponds to the markings depending on the position of the gas pipe in the gas connector.

To connect the gas pipe to the gas connector of the present embodiment the gas pipe is aligned such that the groove can engage in the projection of the gas connector. The gas pipe is then introduced into the gas connector until the red marking appears in the observation port. The gas pipe is thereby connected to the gas connector, while the gas connector 17 is closed gas-tight. The gas pipe is then rotated in the gas connector 17, wherein the gas connector is unlocked by opening the ball valve and the gas pipe is simultaneously secured against detachment. This situation is indicated by the appearance of the green marking in the observation port. In the present embodiment, the gas connector 17 is thus formed such that it can be unlocked on the condition that it is connected to the gas connector.

According to the present embodiment, to detach the gas pipe this is rotated in the gas connector, in a direction opposite the rotation during unlocking. The ball valve is closed, whereby the gas connector is locked gas-tight. Simultaneously, the gas pipe is released and the red marking appears in the observation port. The connection of the gas pipe to the gas connector can then be broken again.

According to embodiments the gas pipes are each connected to a gas line as fluid line, which is not shown in FIG. 2. In embodiments, the two fluid line connection pieces are thus formed such that they can each be connected to one of the two fluid connection devices and a fluid line, e.g. a flexible gas hose. Furthermore, the unlocked fluid connection devices can secure the fluid line connection pieces connected thereto. In the example of FIG. 2 this securing, as described above, can be realized by engagement of the lock 17 in a groove at the gas pipe 20.

According to embodiments the container 11 contains one or more adsorber materials (not shown in the figures), e.g. adsorber materials for desulfurizing liquid gas, gas, natural gas or other hydrocarbons. Furthermore, the container can contain several adsorber materials and the adsorber materials may be present in a mixed bed or as multi-component adsorber material. The materials used are e.g. standard and impregnated activated charcoals, zeolite systems, metal and mixed-metal (oxide) catalysts, and other known materials as well as combinations of the materials in mixed bed and multi-component systems. The materials are mentioned only by way of example and the invention is not limited with regard to the materials. Examples of adsorptive desulfurization adsorbents and systems are described in WO 2004/060840 A2, WO 2006/028686 A1 and US 2009272675 A1, the complete disclosure of which is included by reference here.

Furthermore, according to embodiments, the device for the adsorption treatment may comprise a thermally activating fluid shutoff apparatus and/or a fluid flow controller. The thermally activating fluid shutoff apparatus can be a thermally activating shutoff apparatus (TAE) 30 such as is represented schematically by the cartridge 101 in FIG. 3. The thermally activating shutoff apparatus 30 contains a solder which melts in the event of a fire and interrupts the gas throughflow. Furthermore, alternatively or in addition to the thermally activating shutoff apparatus, optionally a gas flow controller (not shown in FIG. 3), which immediately automatically interrupts the gas throughput if the gas line is intentionally or inadvertently damaged, can be integrated as fluid flow controller. The operation of a thermal shutoff apparatus and of a gas flow controller are described in detail e.g. in DVGW worksheet G600 of April 2008.

In an embodiment, for reversible filling with the adsorber material the container can comprise an opening and closing element which has a safety device to prevent manipulations by unauthorized persons, selected from: a cover for the opening and closing element and a special screw connection which can be opened exclusively by a special tool. The safety device can also be a seal.

Figure 4A:
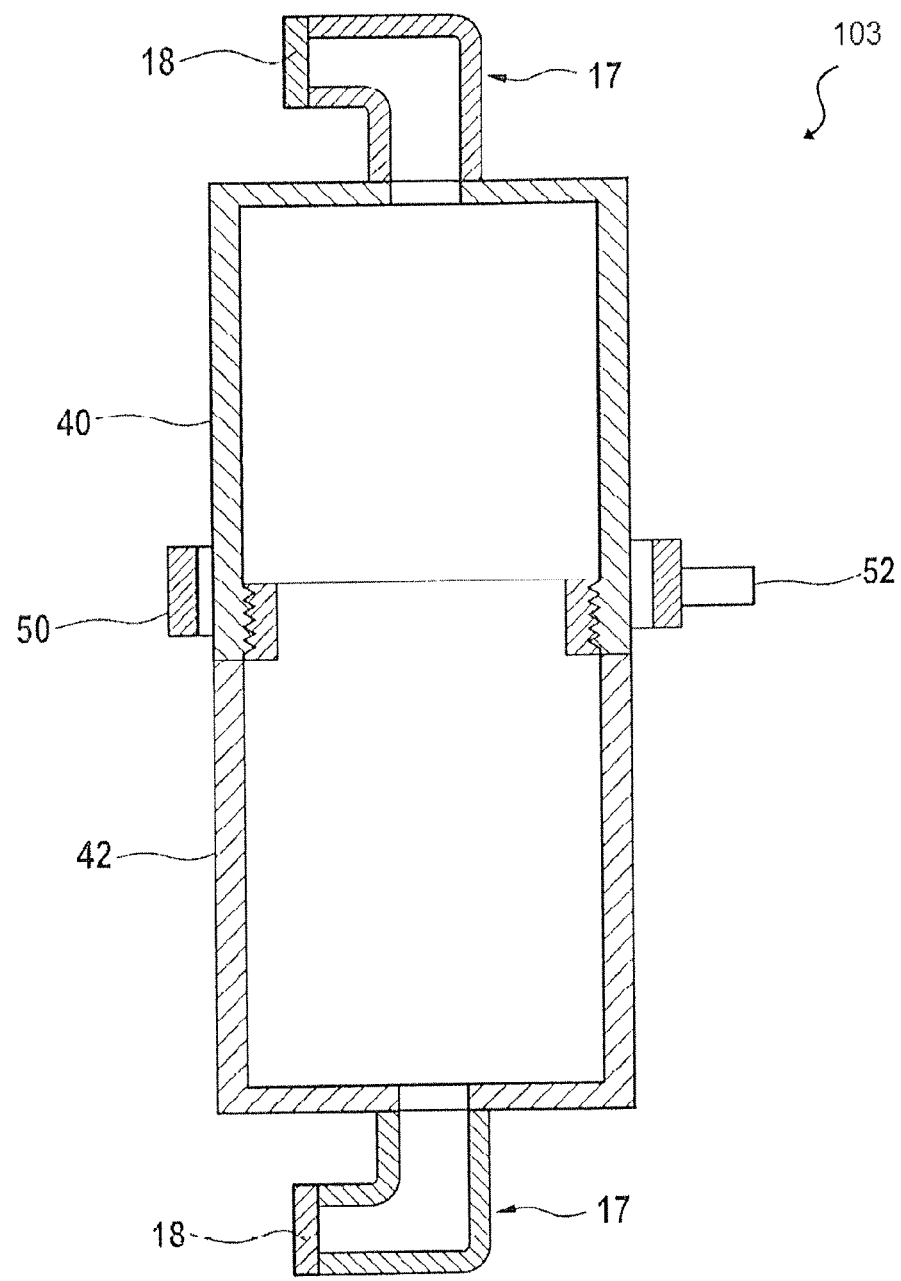
FIG. 4a a schematic representation of a further device according to an embodiment.
Figure 4B:
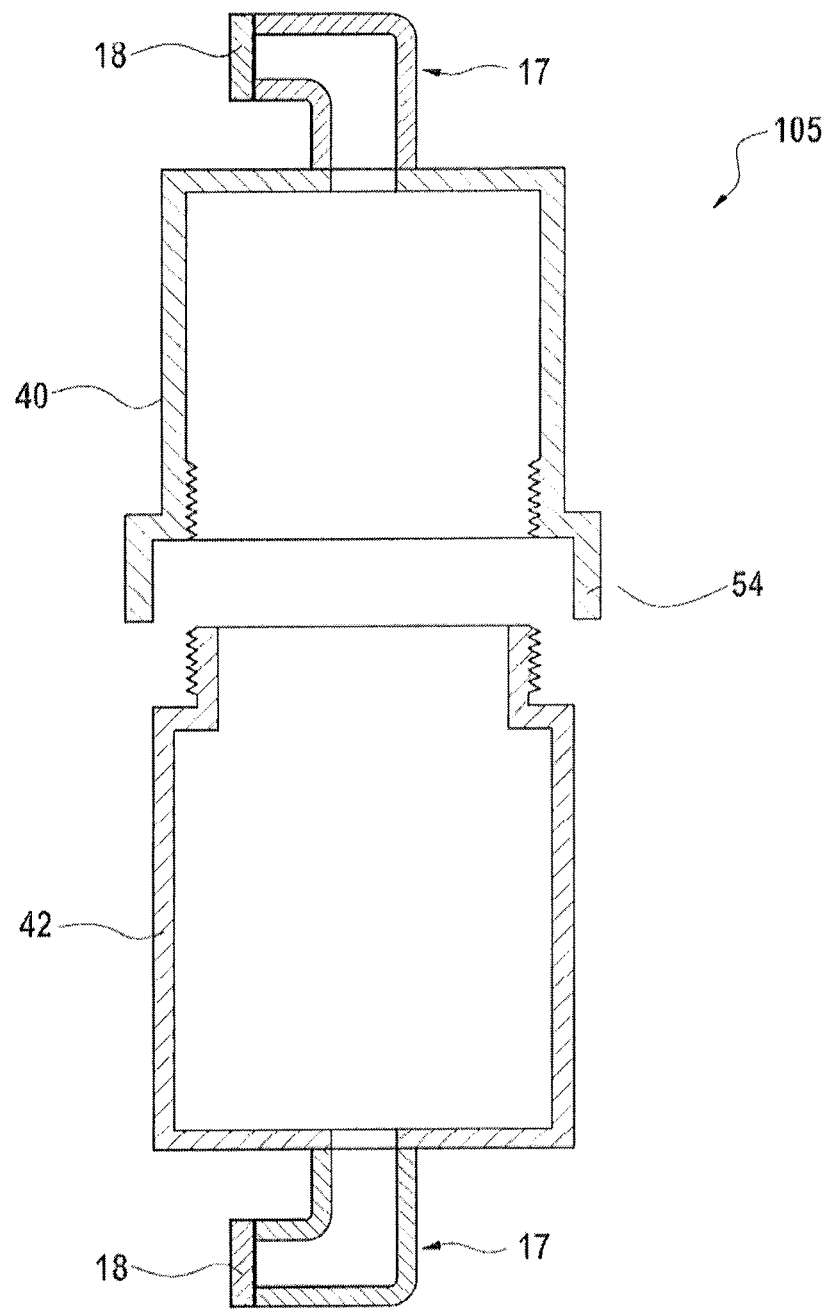
FIG. 4b a schematic representation of a further device according to an embodiment.

For refilling and emptying the container with adsorbent, in an embodiment, the cartridge can be designed such that the container 11 can be opened at one point by means of a screw connection of the cartridge. Examples of this embodiment are shown in FIGS. 4a and 4b as cartridges 103 and 105. The containers of cartridges 103 and 105 each consist, as can be seen in particular from FIG. 4b, of two halves 40 and 42. The half 40 has an inner thread and the half 42 has an outer thread and the halves 40 and 42 can be screwed gas-tight to each other via this thread. This screw connection contains additional safety elements to prevent unauthorized manipulation. In the example of FIG. 4a a removable sleeve 50 is provided over the screw connection which surrounds the periphery of the container and can be or is secured over the screw connection by means of a special screw connection 52. The special screw connection 52 can be opened only with corresponding tools which are not commercially available. The safety element protecting against opening by unauthorized persons can, according to the example of FIG. 4b, also be a cover 54 which is attached to one of the halves of the cartridge 105 and masks the screw connection of the two halves 40 and 42. Another embodiment relates to a combination of cover and sleeve with special screw connection.

To secure the cartridge e.g. against a wall, the sleeve can be provided with a hook by which the cartridge can be secured to a corresponding eye (not shown) which is provided on the wall. The eye can of course also be attached to the sleeve and the hook to the wall. This type of suspension is known e.g. from wall-mounted fire extinguishers. The defined attachment of such a suspension has the advantage that the gas pipes of the gas inlet and outlet of the cartridge cannot inadvertently be wrongly connected if the corresponding gas feed lines are fitted such that the connection is matched to the suspension, e.g. by a defined length of the gas hose. Different fluid connection devices for the gas inlet and gas outlet of the cartridge can of course also be used. Therefore, in a further embodiment of the invention, the fluid connection devices and/or the associated fluid line connection pieces for fluid inlet and fluid outlet are formed with different geometries. Thus confusion between the two connections can be ruled out. The correct throughflow is important in particular for the throughflow of multi-component adsorber systems. In another embodiment of the invention the gas connectors are mounted rotatable at the cartridge with the result that, when installing the cartridge, the service engineer has the greatest possible flexibility with regard to connections of the gas hoses and space conditions.

Figure 5A:
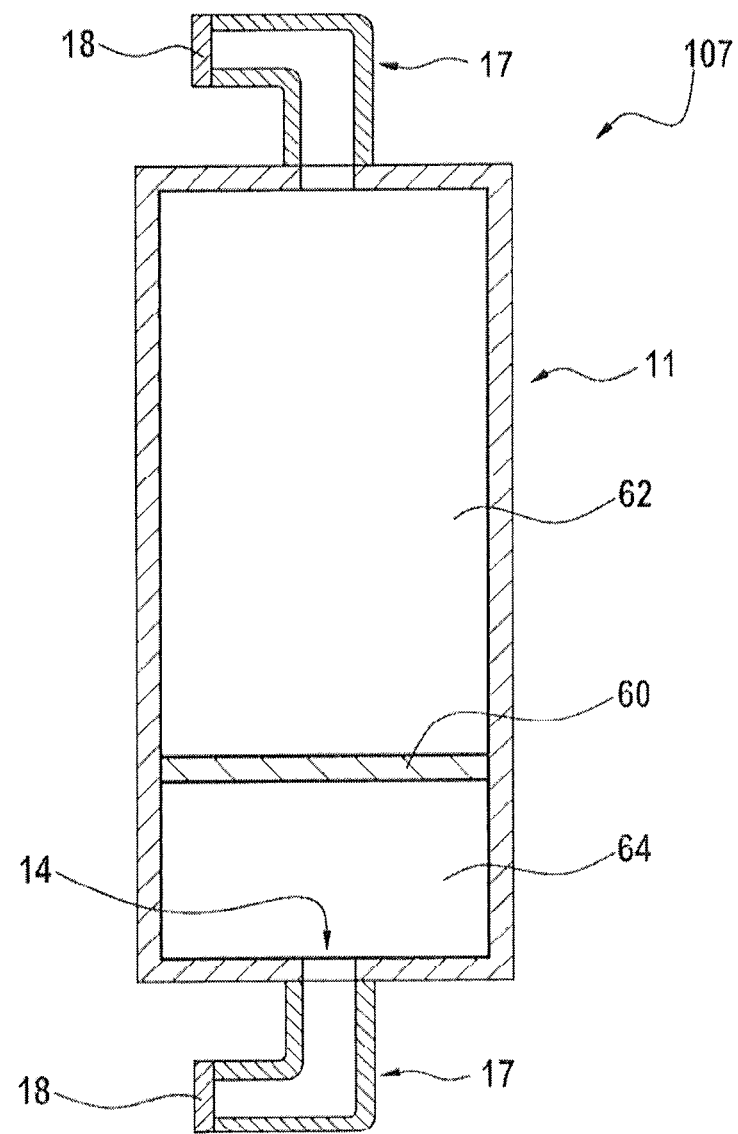
FIG. 5a a schematic representation of a device according to an embodiment.
Figure 5B:
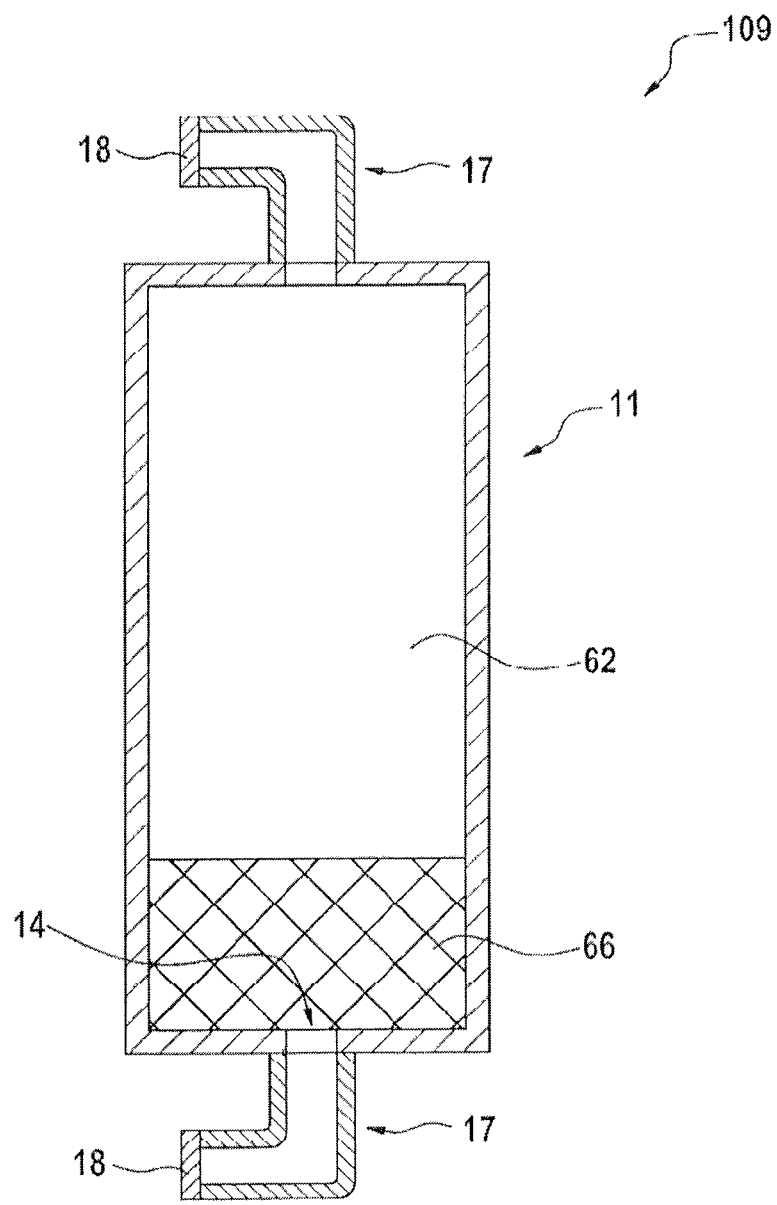
FIG. 5b a schematic representation of a device according to an embodiment.

According to embodiments, the container 11 can be formed such that it can be installed vertically and have, adjoining the fluid inlet, a cavity, or a cavity with or bounded by a flexible and/or porous inert material or plastic foam filling, e.g. for trapping condensate. Examples of these embodiments are represented in FIGS. 5a and 5b as cartridges 107 and 109 which, adjoining the fluid inlet 14, have an unfilled or filled cavity. A corresponding cavity can alternatively or additionally be provided at the fluid outlet. Such cavities also lead individually or in combination to an improvement in the flow distribution of the gas flowing through. In a variant of this embodiment the cavity can contain a condensate drain.

As can be seen from FIG. 5a, the inside of the container 11 of the cartridge 107 is split into two chambers 62 and 64 by a porous, inert and fluid-and/or gas-permeable dividing wall 60. Chamber 62 serves to receive the adsorber material while chamber 64, which adjoins the inlet opening 14, serves to trap condensate. When the cartridge is in operational state, the chamber 64 is an unfilled cavity.

The cartridge 109 represented in FIG. 5b contains, bounding the inlet opening 14, a cavity or space 66 which is equipped with porous and/or flexible inert material or a plastic foam filling. In this, after the fluid or gas has entered the cartridge 109, liquid portions contained in the fluid or gas can be trapped as condensate. For example, artificially produced substances with cellular structure and/or low density based on a plastic are suitable as porous and/or flexible inert material or as plastic foam filling. Examples of such a plastic are PUR flexible foam, polypropylene (PP), polyethylene (PE), cross-linked polyethylene (PE-X), and polyethylene terephthalate (PET). Elastomers, such as e.g. PUR flexible foam, or foams which are based on ceramics or metal or contain same, are particularly preferred.

Measurements and/or lengths described here are examples and can have customary manufacturing and measurement tolerances.

In an embodiment, the outer length of the container between the fluid inlet and the fluid outlet is in a range of from 700 to 800 mm. For example the length between the fluid inlet and the fluid outlet is 729 mm, 717 mm, 723 mm, 750 mm or 756 mm.

In a further embodiment the device including the fluid connection devices is in the range of from 850 mm to 900 mm, for example 871 mm, long.

In embodiments, the container has an external diameter of 110 mm and/or an internal diameter of 90 mm.

In an embodiment, an overall length L1 of the cartridge including the fluid connection devices can be 871 mm. A length L2 of the container between the fluid inlet and the fluid outlet can be 729 mm. The fluid connection devices can each have a shape bent at a 90° angle, e.g. an L shape with two legs. One of the fluid connection devices, e.g. the fluid connection device at the fluid inlet, can have a length L3 of 53 mm when fitted to the cartridge parallel to the length of the container. If this fluid connection device has an L shape, a length L4 of the fluid connection device between the free side of the L form and the container is 21 mm. The other fluid connection device, e.g. the fluid connection device at the fluid inlet, can have a length L5 of 89 mm when fitted on the cartridge parallel to the length of the container. If this fluid connection device has an L shape, the length L6 of the fluid connection device between the free side of the L shape and the container is 56 mm. As an example, cartridge 110 with L-shaped fluid connection devices is shown schematically in FIG. 5c, not true to scale with the above external measurements L1 to L6.

In a further embodiment, the container is 717 mm long and a first opening, selected from the fluid inlet and the fluid outlet, comprises a 33 mm-long tube section. Furthermore a press connector can be provided in the tube section and connected to the associated fluid connection device.

According to an embodiment, in a second opening selected from the fluid inlet and the fluid outlet, a screw connection or bulkhead connection is provided. The bulkhead connection can make the container 6 mm longer.

Furthermore, in embodiments of the device, the fluid connection devices 17 each have a shape bent at a 90° angle. Moreover, the fluid connection devices 17 can each have, at their respective free end, a connection opening, e.g. with an internal diameter of 20 mm, for connection to the respective fluid line connection piece. The distance between the centres of the connection openings can, for example in the embodiment of FIG. 5c, be between 835 and 850 mm or be approximately 839 mm.

Figure 3:
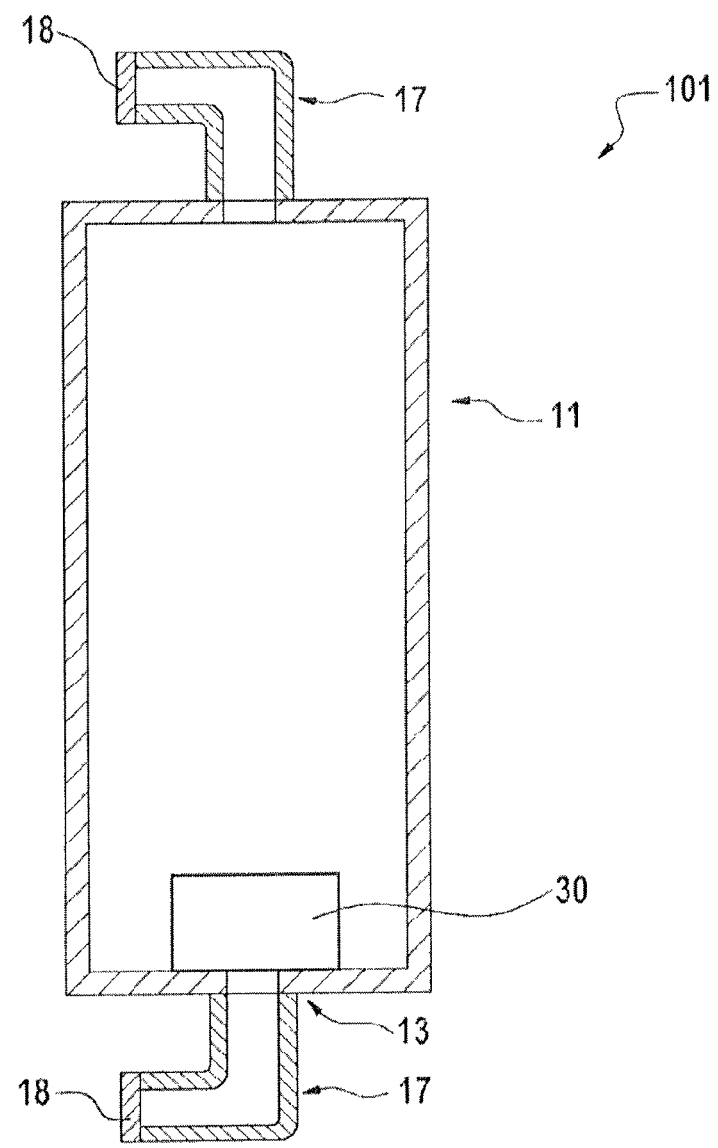
FIG. 3 a schematic representation of a further device according to an embodiment.

FIG. 5d shows schematically, as further embodiment of the device for the adsorption treatment, a cartridge 111 in the complete or partial representations of FIGS. 5d0 to 5d3. The container of cartridge 111 comprises, as represented in the cross-section view of FIG. 5d0, a tube piece 1 on which an end-cap 2 is provided at one end and an end-cap 3 at the other end. End-cap 3 and the associated end of the tube piece 1 are connected to one another by welding. Tube piece 1 and end-cap 2 have complementary threads and are connected to one other via these, wherein an O-ring 5 is provided to form a seal between the tube piece 1 and the end-cap 2. An annular groove is provided in the end-cap 2 for the O-ring 5.

The fluid inlet 14, which is provided with a bulkhead connection 6 which projects by a length L15 of 6 mm from the fluid outlet 14, is provided in the end-cap 3. A safety plug 9 is provided as fluid connection device 17 in the bulkhead connection 6. In the present embodiment, the fluid outlet 16 is welded to a 33 mm-long tube piece 8. A press connector 7, to which a second safety plug 19 is connected as fluid connection device 17, is incorporated in the tube piece 8. One screen each with a 0.5 mm mesh size is provided in the cartridge inside the end-cap 3 in front of the fluid inlet 14 and approximately in the middle of the inside of the cartridge 111.

The container of the cartridge ill, i.e. the connected system comprising tube piece 1, end-caps 2 and 3 and the tube piece 8, has a length L11 of 750 mm. The tube piece 1 has a length L12 of 598.5 mm. The end-cap 3 has a length L13 of 100 mm, while the end-cap 2 has a length L14 of 105 mm. The tube piece 1 and the end-cap 3 have an internal diameter of 90 mm. End-cap 2, on the other hand, has an internal diameter of 96 mm. The tube piece 1 and the end-caps 2 and 3 each have an external diameter of 110 mm. The tube piece 8, the press connector 7 and the safety plugs 9 each have an internal diameter of 20 mm. The annular groove for the O-ring 5 has an internal diameter of 104 mm. The O-ring can be made from a flexible material which is resistant to the fluid to be treated, e.g. from Teflon.

FIG. 5d also comprises detailed representations 5d1, 5d2 and 5d3. The detailed representation of FIG. 5d1 shows a top view onto the end-cap 2 of the cartridge 111 with the safety plug 9 provided there. The detailed representation FIG. 5d2 illustrates an enlarged section Z from the tube piece 8 and from the press connector 7, as lateral top view along the arrow A onto FIG. 5d1. FIG. 5d3 represents a perspectival overall view of the cartridge 111.

FIG. 5e illustrates an example of the device according to the embodiment of FIG. 5d with technical details. The measurements of the individual components with reference numbers 1 to 9 are explained in more detail in the parts list. The example of FIG. 5e has a general tolerance according to ISO 2768-m. At least one of the safety plugs 9 may be an Allgas GT DN 15 safety plug.

TABLE

List of parts in FIG. 5e

| Item | Quantity | Unit | Designation |
|---|---|---|---|
| 1 | 1 | piece | Tube piece DN 110 × 10.0 |
| 2 | 1 | piece | End-cap, long DN 110 × 10.0, with thread |
| 3 | 1 | piece | End-cap, long DN 110 × 10.0, without thread |
| 4 | 2 | piece | Screen with mesh size 0.5 mm |
| 5 | 1 | piece | O-ring, diameter 96 × 5 |
| 6 | 1 | piece | Bulkhead connection SV12MS PN 16/40 |
| 7 | 1 | piece | Press connector 20 × ½" IG |
| 8 | 1 | piece | Tube piece, diameter 20, 33 mm long |
| 9 | 2 | piece | Safety gas connector DN 15 |

Surprisingly it was found that a flow through the cartridge from bottom to top has positive effects on the desired homogeneous inflow of the adsorbents. According to a particularly preferred embodiment, therefore, the cartridge is formed such that it can be installed perpendicular and can be flowed through from bottom to top. Furthermore, as explained above, it can have between gas inlet opening 14 and adsorber a cavity, optionally filled with porous inert material or bounded by same, for trapping condensate. If the cavity is designed as flexible porous inert material layer, e.g. flexible porous plastic foam, this can also be advantageous with regard to filling and wear resistance of the adsorbents. For example, when filling the adsorbents between a flexible inert material layer in a cavity at the bottom and a correspondingly identical layer in a cavity at the top of the cartridge, the adsorber particles are trapped between the two layers. The flexibility of such an inert material layer, e.g. a plastic foam, offers advantages with regard to the wear resistance of the adsorbers e.g. when transporting the cartridge. In addition to the formation of rubbings, the penetration of dust in following catalyst stages can also be reduced, in particular if the plastic foam simultaneously has a filtration action and thus prevents powdery constituents of the adsorbent being removed with the gas.

According to a particular embodiment the cartridge may comprise: a resealable container with two safety gas connections, i.e. at the gas inlet and gas outlet, a gas inlet and gas outlet zone to improve the flow distribution of the gas flowing through, a simple suspension and/or several safety elements to protect against being opened by unauthorized persons.

According to another embodiment a method for regenerating and/or disposing of, filling and/or installing the device for the adsorption treatment of a fluid or fluid stream is provided, comprising at least one of the steps: filling the container with the adsorber material, e.g. under protective gas, inert fluid, inert gas or the fluid which no longer contains an adsorbate to be removed by the adsorption treatment; flushing of the container during and/or after filling the container with the adsorber material, e.g. with protective gas, inert fluid, inert gas or the fluid which no longer contains an adsorbate to be removed by the adsorption treatment; carrying out a pressure and/or leak test to check the tightness of the filled container with locked fluid connection devices; installing the device for the adsorption treatment of a fluid or fluid stream before or in an apparatus provided for same while the container is filled with adsorber material and an element selected from inert fluid, inert gas or the fluid which no longer contains an adsorbate to be removed by the adsorption treatment; and installing the device for the adsorption treatment of a fluid or fluid stream according to the previous embodiment before or after the gas compressor of a fuel cell.

Here, filling the container with adsorber material means that the container is filled, completely or partly, with adsorber material such that in both cases there is free volume for fluid or gas. Thus the container can also be filled with gas or fluid.

In a further embodiment a method for regenerating and/or disposing of, filling and/or installing the device for the adsorption treatment of a fluid or fluid stream is provided, comprising at least one of the following steps.

One of the steps comprises removing the device for the adsorption treatment of a fluid or fluid stream, the container of which contains adsorber material to be regenerated and/or disposed of, from an apparatus at or in which an adsorption treatment has been carried out, by detaching the fluid connection devices 17 of fluid line connection pieces 20 which are connected to the apparatus. The detaching of the fluid connection devices 17 of the fluid line connection pieces 20 can take place while the container is filled with fluid which has been or is to be treated.

A further possible step of the method for regenerating and/or disposing of, filling and/or installing the device for the adsorption treatment comprises transporting the container with the adsorber material to be regenerated and/or disposed of and locked fluid connection devices accompanied by safety precautions and/or under protective gas, inert fluid or inert gas. In the method for regenerating and/or disposing of, filling and/or installing the device for adsorption treatment all, individual or several transport steps can be carried out accompanied by safety precautions, such as e.g. under protective gas, inert fluid or inert gas, wherein the protective gas, inert fluid or inert gas can be provided inside and/or outside the container. Examples of further safety precautions during transport are: a suitable packaging with special protection for individual components such as, e.g., the fluid connection devices, in order that no physical damage can occur to the cartridge during transport; a marking with warnings, e.g. "Do not open, cartridge may contain residues of dangerous contents"; and preventing gas exchange with the outside of the container by using intrinsically safe connections.

Furthermore, in a step of the method for regenerating and/or disposing of, filling and/or installing the device for adsorption treatment, the container with the adsorber material to be regenerated and/or disposed of and locked fluid connection devices are transported to a regeneration and/or disposal centre. There, for example, accompanied by safety precautions, the device can be opened and the adsorber material replaced or regenerated. In the regeneration and/or disposal centre the equipment may be present and used that is required for safe handling and regeneration of the device for the adsorption treatment of a fluid or fluid stream and/or for safe handling, regeneration and/or disposal of the adsorber material. If the container comprises for reversible filling with the adsorber material an opening and closing element which has a safety device to prevent manipulation by unauthorized persons, special equipment or special tools not available in the trade but only accessible to specialists may be present and used in the regeneration and/or disposal centre for handling the safety device. For example, the container of the device may comprise a safety device selected from: a cover for the opening and closing element and/or a special screw connection which can be opened exclusively by special tools. The safety device can also be a seal which can be opened only by specialists.

Examples of further possible protective or safety precautions in regeneration and/or recycling are: flushing of the cartridge with inert gas before opening as, in the case of some adsorbates an explosive gas mixture may form upon opening, or for example in the case of sulfur adsorbers pyrophoric reactions with air may proceed; opening and refilling of the adsorber materials which are spent or to be regenerated accompanied by common safety precautions for the personnel in the regeneration and/or disposal centre, for example personal protective equipment, such as protective goggles and respiratory protection, air replacement and extraction of any contaminated air; and oxidative secondary treatment of the flushing gas which possibly contains fluid residues from the cartridge.

Furthermore, the method for regenerating and/or disposing of, filling and/or installing the device for the adsorption treatment can comprise at least one of the following steps: flushing of the container which contains adsorber material to be regenerated and/or disposed of, with protective gas, inert fluid, inert gas or other gases such as air; emptying of the container of the adsorber material to be regenerated and/or disposed of, e.g. under protective gas, inert fluid or inert gas; disposing of and/or regenerating the adsorber material to be regenerated and/or disposed of; filling the container with regenerated or unused adsorber material, e.g. under protective gas, inert fluid, inert gas or the fluid which no longer contains an adsorbate to be removed by the adsorption treatment, during and/or after filling the container with the regenerated or unused adsorber material; flushing the container with protective gas, inert fluid, inert gas or the fluid which no longer contains an adsorbate to be removed by the adsorption treatment, during and/or after filling the container with the regenerated or unused adsorber material; and carrying out a pressure and/or leak test to check the tightness of the filled container with locked fluid connection devices.

For example, the following sequence of a removal of a spent adsorber material from the cartridge is possible: firstly, the container is flushed with $N_2$ until the residual gas in the container is removed. The container is then opened. Then, the adsorber material is removed from the container and packed into a special container for disposal. Furthermore, in an example, the container with the regenerated or unused adsorber material is filled under air and then flushed with inert gas. A small quantity of residual air may remain in the container, since the inert gas serves mainly to expel most of the air in the container for subsequent applications.

Furthermore, the method for regenerating and/or disposing of, filling and/or installing the device may include: transporting the container with the regenerated or unused adsorber material and locked fluid connection devices to an apparatus at or in which an adsorption treatment is to be carried out; and/or connecting fluid line connection pieces 20 to the apparatus. Moreover, the device for the adsorption treatment of a fluid or fluid stream can be installed at or in the apparatus, while the container is filled with regenerated or unused adsorber material and an element selected from protective gas, inert fluid, inert gas or fluid which no longer contains an adsorbate to be removed by the adsorption treatment by connecting the fluid connection devices 17 to fluid line connection pieces 20 which are connected to the apparatus.

Embodiments of the method for regenerating and/or disposing of, filling and/or installing the device for adsorption treatment make it possible for the device containing spent adsorber material for adsorption treatment to be removed from an apparatus at or in which the adsorption treatment has been carried out and transported to a regeneration and/or disposal centre, while the gas treated or to be treated by the adsorption treatment is in the device for adsorption treatment. Furthermore, embodiments of the method for regenerating and/or disposing of, filling and/or installing the device for adsorption treatment make it possible for the device for adsorption treatment containing adsorber material which is unused or to be regenerated to be transported to an apparatus at or in which the adsorption treatment is to be carried out while protective gas is in the device for adsorption treatment.

In an example of the method for regenerating and/or disposing of, filling and/or installing the device for the adsorption treatment, a cartridge which contains adsorber material to be regenerated and/or disposed of is arranged at an apparatus at which a desulfurization treatment has been carried out. The cartridge comprises the container 10 and the gas connectors 17 of the example of FIG. 4b. The gas pipes 20 which are connected to the apparatus and the gas connectors 17 are detached from the gas connectors 17 while there is natural gas in the container. Upon detachment, the fluid connection devices 17 on the container 10 are closed by the bars 18, with the result that the cartridge is locked gas-tight. The cartridge is then transported to the regeneration and/or disposal station. There, the natural gas present in the cartridge is removed, accompanied by safety precautions in order to prevent explosions or contact with personnel and the cartridge is optionally flushed with protective gas. The cartridge is then opened by releasing the thread lock. The cartridge then has the spent adsorber material removed from it, optionally under a protective atmosphere, is filled with fresh or regenerated adsorber material and then flushed with protective gas. Finally, the cartridge is transported to an apparatus at or in which a desulfurization treatment is to be carried out and connected to the apparatus while protective gas is in the cartridge.

According to embodiments, the apparatus at or in which an adsorption treatment is to be carried out can be a fuel cell or a gas compressor of a fuel cell. The device for the adsorption treatment of a fluid or fluid stream or the apparatus at or in which an adsorption treatment is to be carried out can have an adsorbate detector or sulfur detector, and the regeneration and/or disposal of the device for the adsorption treatment of a fluid or fluid stream can be carried out according to whether an adsorbate or sulfur compounds have been detected. Furthermore, the apparatus at or in which an adsorption treatment is to be carried out is provided with at least one shutoff valve which is installed in flow direction before or after the device for the adsorption treatment of a fluid or fluid stream.

In addition to the filling, installing and removal, regeneration and disposal, a service cycle can also include safety measures, here also called safety precautions. An example of one embodiment is the carrying out of a pressure and/or leak test before delivery of the cartridge. Such a test enables the industrial-scale tightness to be checked. In a particularly advantageous embodiment of the invention, a pressure or leak test with $N_2$ or other known inert gases, such as e.g. $CO_2$, He, Ne, or Ar, can take place prior to the delivery of the cartridge. This has the advantage that after insertion of the cartridge into the gas line and opening of the gas tap in the cartridge, no explosive mixture can form or following components be damaged. If, on the other hand, the cartridge is filled under air and no flushing procedure is integrated into the filling procedure, the cartridge contains air which, mixed with the combustion gas, can form explosive mixtures or lead to problems in downstream system parts. If e.g. a reduced and thus pyrophoric reformation catalyst, for example a Ni catalyst or a water-gas shift catalyst containing Cu/Zn is brought into contact with air, violent oxidation reactions can form and in the worst case cause metal burns.

In a further preferred embodiment of the invention, the cartridge can be flushed instead of with natural gas with the main constituent of a gas to be treated and delivered. An example of this is sulfur-free natural gas or pure methane or industrial-grade, sulfur-free propane or butane for the use of liquefied gas.

When loading the container with regenerated or unused adsorber material, one or more of the following steps can be carried out: monitoring of the weighed-in quantity using gravimetric or volumetric methods; shaking or vibrating during filling of the container in order to ensure an optimal settling of the feedstock; and air extraction of the fine dust particles as safety precaution.

A flushing procedure can take place after the container has been filled with adsorber material with inert gas, such as e.g. $N_2$, and/or before carrying out a pressure or leak test: for example, firstly the container is flushed with $N_2$ until the residual oxygen content to be defined in the cartridge is not reached, the pressure is then raised to pressure and/or leak test level with the same inert gas. The pressure or leak test then follows, e.g. by determining the pressure difference, the pressure drop or a leak rate at a suitable pressure. After a successful pressure or leak test, the $N_2$ is drained again until roughly ambient pressure is reached. The connections are closed and the cartridge is under $N_2$. A further flushing is typically not necessary.

The regeneration of the adsorber material can take place thermally, e.g. with steam, air or other hot gaseous media at temperatures higher than 200° C. A disposal can be carried out e.g. destructively with recovery of the metals: for example, sulfur is burned accordingly from a Cu/Mn adsorber, then Cu and Mn are melted using thermal methods, separated and recovered as solution.

Examples of protective gas, inert fluid or inert gas are $N_2$, Ar, He, nitrogen enriched air (NEA), $CO_2$, or the respective pure gas which is to be treated with the adsorber material. The installation of the cartridge can optionally be carried out in front of the fuel cell (externally) or in the fuel cell casing (internally). In the case of an external installation, it is to be borne in mind that the desulfurized gas no longer contains odorants after flowing through the cartridge and no warning odour is emitted in the case of a leak. The gas section following the cartridge and before entry into the fuel cell device can therefore be formed such that it contains no internal fittings. A possible solution is for example the mounting of a gas hose or a similar line section in the fuel cell casing, with the result that the mounting is not accessible from the outside. If the accessible free end of the gas hose to which the gas pipe is fitted is connected to the provided connector on the cartridge, no non-odorized gas can emerge. As the gas section up to the gas connector contains no further internal fittings or screw connections, the gas section can be classified as industrially permanently leak-proof, after the pressure test has been carried out. The replacement procedure as well as the operation of the cartridge can be carried out safely with the described structure.

In the case of an internal installation, according to embodiments additional safely measures such as e.g. gas detection sensors or an extraction of the air in the casing are provided. Thus gas leaks can be detected irrespective of the odorant content or the formation of an explosive atmosphere prevented. In the case of internal installations, according to embodiments a distinction is made as to whether the cartridge is installed before or after a gas compressor. In the case of installations before a compressor, negative pressure can arise in the case of operation-induced problems, in the case of an installation after a gas compressor a slight positive pressure can be assumed as operating pressure.

In addition to the pressures, different operating temperatures result with the different installation variants. In the case of installations in a fuel cell casing, temperatures of up to 70° C. are conceivable, while in the case of external installations ambient temperatures prevail e.g. in cellars.

Therefore, in embodiments the cartridge and/or the adsorber material used can be used at temperatures of from −10 to +90° C. and a pressure range of from −500 mbar above atmospheric pressure to +10 bar over atmospheric pressure, preferably at a temperature range of from −10 to +80° C. and a pressure range of from −300 mbar over atmospheric pressure to +3 bar over atmospheric pressure, and particularly preferably at a temperature range of from −10 to +70° C. and a pressure range of from −100 mbar over atmospheric pressure to +100 mbar over atmospheric pressure. The unit "bar over atmospheric pressure" used here corresponds to the unit barg and means bar relative to atmospheric pressure.

In a further embodiment a method for the adsorption treatment of a fluid or fluid stream is provided, in particular for desulfurizing natural gas or liquefied gas for fuel cells, comprising: providing the device for the adsorption treatment of a fluid or fluid stream according to one of the embodiments described here, wherein the container has been or is filled with an adsorber material for the adsorption treatment of fluids, connecting a fluid feed line to a first fluid line connection piece and a fluid drainage line to a second fluid line connection piece, connecting the first and second fluid line connection piece to the two fluid connection devices of the device for the adsorption treatment of a fluid or fluid stream and thereby unlocking the fluid connection devices, and introducing a fluid into or passing a fluid through the device for the adsorption treatment of the fluid.

It is provided in an embodiment that the cartridge is operated in combination with a shutoff valve which is installed in front of the cartridge. In another embodiment of the invention the cartridge can be operated in combination with a sulfur detector. Operation in combination with a sulfur detector makes possible dynamic change cycles of the cartridges, depending on the amount of sulfur absorbed and independently of regional differences in the natural gas composition.

According to embodiments described here, the device for the adsorption treatment of a fluid or fluid stream is formed or aligned such that the fluid is passed vertically from the bottom upwards through the device.

If the fluid is passed vertically from the bottom upwards through the device, and if the adsorber feedstock settles on the wall of the cartridge container, e.g. as a result of vigorous shaking or transportation procedures, there can, unlike with a horizontal installation and throughflow, be no boundary current effect and thus no premature breakthrough of sulfur substances.

Furthermore, operating the flow from bottom to top has advantages in terms of operational safety given that condensed water is also entrained in e.g. natural gas. It is known that water can occur at least in gas form in gas lines. Where there is possible condensation, e.g. during the entry of gas into cool areas of a cellar, in the case of accumulation and in the case of the transportation of liquid water in the gas, the adsorbents used can therefore be brought into contact with liquid water. In this case, the adsorbents can engage in unwanted reactions with water or else lose their functionality and thus not maintain fault-free operation. In order to reduce the risk of the adsorbent coming into contact with liquid water, the method can be carried out such that the cartridge is flowed through vertically from bottom to top. If, in addition, a cavity or a cavity filled with or bounded by highly porous inert material is provided between gas inlet and adsorber, possible condensate can be retained in this. The combination of operating the flow from the bottom upwards with the described cavity can also have positive effects on the flow distribution in the gas inlet area. Surprisingly it was found that a throughflow of the cartridge from bottom to top has positive effects on the desired homogeneous inflow of the adsorbents, as was already explained above in connection with FIGS. 5a and 5b.

According to a further embodiment of the method described here, the device for the adsorption treatment of a fluid or fluid stream is operated in combination with an adsorbate detector or sulfur detector and the replacement of the device is carried out according to whether an adsorbate or sulfur compounds have been detected. Furthermore, the device for the adsorption treatment of a fluid or fluid stream can be operated in combination with a shutoff valve which is installed in flow direction in front of or after the container. The safety of the operation of the device according to the invention can be increased by these measures.

In another embodiment of the method, in particular in combination with a sulfur detector, the fluid can have a purity of <50 ppb residual sulfur after being passed through the device.

In a further embodiment of the method, the fluid is passed through the device at temperatures of from −10 to +90° C. and a pressure in a pressure range of from −500 mbar over atmospheric pressure to +10 bar over atmospheric pressure. A method for producing a desulfurized fuel gas for fuel cells is thus provided in which the fuel gas, in particular natural gas and liquefied gas, is desulfurized by using suitable adsorbents at temperatures of from −10 to +90° C. and a pressure range of from −500 mbar over atmospheric pressure to +10 bar over atmospheric pressure, preferably at a temperature range of from −10 to +80° C. and a pressure range of from −300 mbar over atmospheric pressure to +3 bar over atmospheric pressure, and particularly preferably at a temperature range of from −10 to +70° C. and a pressure range of from −100 mbar over atmospheric pressure to +100 mbar over atmospheric pressure. In the case of installations of the device according to the invention in a fuel cell casing, temperatures of up to 70° C. are possible, whereas in the case of external installations ambient temperatures can prevail, for example in cellars.

In embodiments, the container of the cartridge can be formed tubular or cylindrical, but other shapes of the container are conceivable. Equations and explanations given here which relate to tubular cartridge containers are to be understood analogously in the case of non-tubular cartridges.

According to an embodiment of the device and of the method, the container can have a feedstock length-to-feedstock diameter ratio (L/D ratio) of from 0.1 to 40, and/or a space velocity of <10.000 b$^{-1}$ relative to the total quantity of the adsorber material can be set in the container. In an advantageous embodiment, the minimum L/D ratio is in a range of from 1 to 20 and in a particularly advantageous embodiment in a range of from 1 to 10. Furthermore, in a particularly preferred embodiment the space velocity is less than 2000 h$^{-1}$ relative to the total quantity of the adsorber material. According to a preferred embodiment of the invention, the feedstock-to-particle diameter ratio has values greater than 10, in a particularly preferred embodiment values greater than 20. These embodiments effect a particularly favourable breakthrough behaviour of the device for the adsorption treatment of a fluid or fluid stream as is explained below.

The feedstock length-to-feedstock diameter ratio (L/D ratio) is the ratio of the length of the packed bed to its diameter. The equation for this reads:

$$L/D \text{ ratio} = \frac{L_{Feedstock}}{D_{Feedstock}}$$

$L_{Feedstock}$: flowed-through length of the feedstock in axial direction
$D_{Feedstock}$: diameter of a cylindrical feedstock A higher L/D ratio means a longer path through the adsorber and thus a longer residence time (see below) in the adsorber bed. An L/D ratio in the range of from 0.1 to 40 therefore has a positive effect on the breakthrough point. If the L/D ratio varies, in the case of a tubular container of the cartridge, the diameter of the feedstock or of the container changes. Given a constant bed volume and gas volume flow, this results in a change in the flow rate. This change occurs both in the free cross-section of the container of the cartridge, which is also called reactor here, and inside the feedstock. The following equation shows the relationship between the empty tube speed and volume flow and reactor diameter.

$$W_0 = \frac{\dot{V}_{Gas}}{A} = \frac{\dot{V}_{Gas}}{D_{Reactor}^2 \cdot \frac{\pi}{4}}$$

$W_0$: flow rate of the fluid in the empty tube (empty tube speed)
$\dot{V}_{Ga}$: gas volume flow
A: reactor cross-section surface
$D_{Reactor}$: reactor diameter A higher empty tube speed can have negative effects on the breakthrough capacity of the adsorbent, as the molecules to be removed have less time available for the sorption. This can thus have an accelerating effect on the breakthrough point.

The choice of space velocity has a similar influence on the breakthrough capacity. The space velocity (SV) is the reciprocal of the residence time and one of the most important operating parameters for catalysts and adsorbents. It is calculated according to the following formula:

$$SV = \frac{\dot{V}_{Gas}}{V} = \frac{w_0 \cdot A}{V}$$

$W_0$: flow rate of the fluid in the empty tube (empty tube speed)
V: packed bed volume
A: reactor cross-section surface The space velocity is usually given in the unit 1/h and is related to NL/h/L adsorbent. In chemical engineering the empty tube speed is often expressed indirectly by the space velocity, as this is directly proportional to the empty tube speed and also expresses the relationship with the bed volume used. However, no relationship to the shape of the packed bed is given. As can be seen from the formula, it is directly proportional to the flow rate. Therefore a higher space velocity likewise has an accelerating effect on the breakthrough time. Measured values showed that low space velocities have positive effects on the breakthrough capacity of the chosen adsorbent and delaying effects on the breakthrough time. For this reason, in embodiments low space velocities of less than approximately 10000 h$^{-1}$ are chosen. A further important reason for the choice of low space velocities is the required operating life of the adsorbent. The service interval for example of fuel cell-domestic heating systems is not to be less than one year. A certain minimum quantity of adsorber is therefore necessary in order to achieve the required gas purity over the period.

According to a preferred embodiment of the invention, the feedstock-to-particle diameter ratio has values greater than 10, in a particularly preferred embodiment values greater than 20. The feedstock-to-particle diameter ratio is defined as follows:

$$D/d_P = \text{ratio} = \frac{D_{Feedstock}}{d_P}$$

$D_{Feedstock}$: diameter of a cylindrical feedstock
$d_p$: average particle diameter.

The porosity, also called voids fraction, is higher at the wall of a fixed-bed adsorber than in the rest of the packed bed. Therefore, so-called boundary current effects may result on the wall. These effects can result in an earlier breakthrough time e.g. of a sulfur compound. The average porosity of spherical feedstocks is between 0.37 and 0.4. With these feedstocks, the marginal porosity is approximately 0.5. Desulfurization adsorbents customary in the trade, such as e.g. the spherical material FCDS-GS12 from SüdChemie AG, have an average porosity of 0.32. To avoid boundary current effects, in an embodiment, at least a $D/d_P$ ratio of greater than approximately 10 is observed.

EXAMPLES

Tests were carried out on a desulfurization test system as examples of embodiments of the invention. The desulfurization plant has four cylindrical cartridges as devices for adsorption treatment through which different gases were able to flow parallel. The cartridges were each provided with gas connectors at the gas inlet opening and at the gas outlet opening and connected to corresponding gas pipes with a respective gas line. The gas connectors and gas pipes come from the manufacturer Viega, component: ½" type TAE (G2016T) #526 788, the gas lines each consisted of gas hoses from the manufacturer Viega, component ½"×500 mm (G2023) #531 904.

The aim of test 1 was to document the effects of the L/D ratio and the space velocity in order to show that both parameters have a direct influence on the adsorption capacity, e.g. on the desulfurization capacity, of the material or the cartridge. The aim of test 2 was to analyze the flow in the inlet area of the cartridge.

The entering and emerging gas was able to be analyzed specifically for sulfur compounds with a gas chromatograph which was connected to the gas outlet and the gas inlet of the plant and equipped with a pulsed flame-photometric detector (GC-PFPD). Brooks mass flow controllers made it possible to precisely regulate the fed gases. A sequential desulfurization bed as in WO 2006/028686 A1 in the ratio 3 to 1 was chosen as test adsorbent. The adsorber material used was composed of Ca-substituted 13X zeolite (FCDS-GS12) according to Example 1 of WO 2006/028686 A1 sequentially in combination with a Cu/Mn mixed metal oxide material (FCDS-GS6) according to Example 2 of WO 2006/028686 A1. The 13X zeolite had a Si:Al equivalence ratio of 1.17 and a calcium substitution of 70%, wherein the remaining metal ions comprised sodium and/or potassium. The Cu/Mn mixed metal oxide material contained 34 wt.-% manganese compounds, 54 wt.-% iron oxide, comprising $Fe_2O_3$, and 12% aluminium oxide with a surface area of 294 $m^2/g$. Further test data are shown in Table 1.

TABLE 1

General data of the desulfurization test

| General test data | | | |
|---|---|---|---|
| Pressure | p_abs | bar | 2 |
| Temperature | T | ° C. | 40 |

| Feedstock data | | | |
|---|---|---|---|
| Feedstock total volume | V | [ml] | 2.1 |
| Feedstock volume Ex. 1 WO06/028686 | V_Bsp.1 WO06/028686 | [ml] | 1.5 |
| Feedstock volume Ex. 2 WO06/028686 | V_Bsp.2 WO06/028686 | [ml] | 0.6 |
| Particle size Ex. 1 WO06/028686 | d_p_Bsp.1 WO06/028686 | [mm] | 0.8-1 |
| Particle size Ex. 2 WO06/028686 | d_p_Bsp.2 WO06/028686 | [mm] | 0.8-1 |
| Bulk density Ex. 1 WO06/028686 | p_schuett_Bsp.1 WO06/028686 | [g/ml] | 0.65 |
| Bulk density Ex. 2 WO06/028686 | p_schuett_Bsp.2 WO06/028686 | [g/ml] | 0.74 |

| Test gas composition | | | |
|---|---|---|---|
| Methane | $CH_4$ | [%] | 98% |
| Carbon dioxide | $CO_2$ | [%] | 1.00% |
| Nitrogen | $N_2$ | [%] | 0.75 |
| Tetrahydrothiophene | THT | [ppm] | 10 |
| Ethyl mercaptan | EM | [ppm] | 10 |
| Carbonyl sulfide | COS | [ppm] | 10 |
| Hydrogen sulfide | $H_2S$ | [ppm] | 5 |

The sorbents were reduced to the grain size fraction 0.8 to 1 mm by milling and screening. As a precise volume determination is very difficult given the small sorbent volumes, bulk density measurements were taken separately with the materials and the sorbent quantities were weighed in for the tests. In this way, it was able to be ensured that identical sorbent quantities were used for every single test.

Test 1

Little is known about the specific influence of the L/D ratio of feedstock reactors on adsorber performance. However, this influence is very important for the design of an adsorption cartridge, for which reason tests with L/D ratios were carried out (cf. Table 2). Space velocities in the region of between 3000 and 15000 l/h were set. The tests were constructed such that for each test run a space velocity and four fixed L/D ratios were measured. Table 2 lists the test variants.

TABLE 2

Variants of the desulfurization tests

| Space velocity variation | | | | | |
|---|---|---|---|---|---|
| | | | | Test no. | |
| | | | 1 | 2 | 3 |
| Volume flow per reactor | V. | [l/h] | 6.3 | 10.5 | 20.9 |
| Space velocity | GHSV | [l/h] | 3000 | 5000 | 10000 |

| L/D variation | | | | | | |
|---|---|---|---|---|---|---|
| | | | | Reactor | | |
| | | | 1 | 2 | 3 | 4 |
| Length-to-diameter ratio | L-D | [—] | 2.0 | 3.9 | 3.9 | 7.4 |
| Reactor diameter | D | [mm] | 11.0 | 8.8 | 8.8 | 7.1 |
| Feedstock length (/-height) | L | [mm] | 22.0 | 34.4 | 34.4 | 52.8 |

Once the test gas flowed through the adsorbent-filled cartridges the GC-PFPD detector was used to record the breakthrough behaviour relative to the L/D ratio. The breakthrough is defined as the point or the breakthrough capacity at which for the first time a specific sulfur compound in the gas is detected after the adsorber bed. The detection limit was 200 ppb per sulfur compound. How much sulfur passes through the cartridge can be calculated from the defined gas volume and the defined sulfur constituents and concentrations in the gas. This is called breakthrough capacity. The load at the breakthrough time can be calculated from this via the weighed-in sorbent mass.

Table 3 shows by way of example the measured breakthrough capacities of the desulfurization bed which was modelled on Example 1 of WO2006/028686, as the ratio of mass compound to mass of sorbent. The breakthrough capacities were determined using the breakthrough time. In this case, a concentration of 1 ppm THT (tetrahydrothiophene) at the cartridge outlet was defined as breakthrough. What quantity of sulfur had been absorbed by the adsorber was able to be calculated via the volume throughput up to this point and via the quantity of sulfur compounds.

TABLE 3

Breakthrough capacities for THT at breakthrough point 1 ppm

| Values in m-% THT | THT Example 1 from WO 2006/028686 | | |
|---|---|---|---|
| RG [1/h]\|L/D [—] | 2 | 3.9 | 7.4 |
| 10000 | 12.5 | 13.1 | 14.0 |
| 5000 | 13.9 | 14.2 | 15.0 |
| 3000 | 13.7 | 14.6 | 15.6 |

Figure 6:
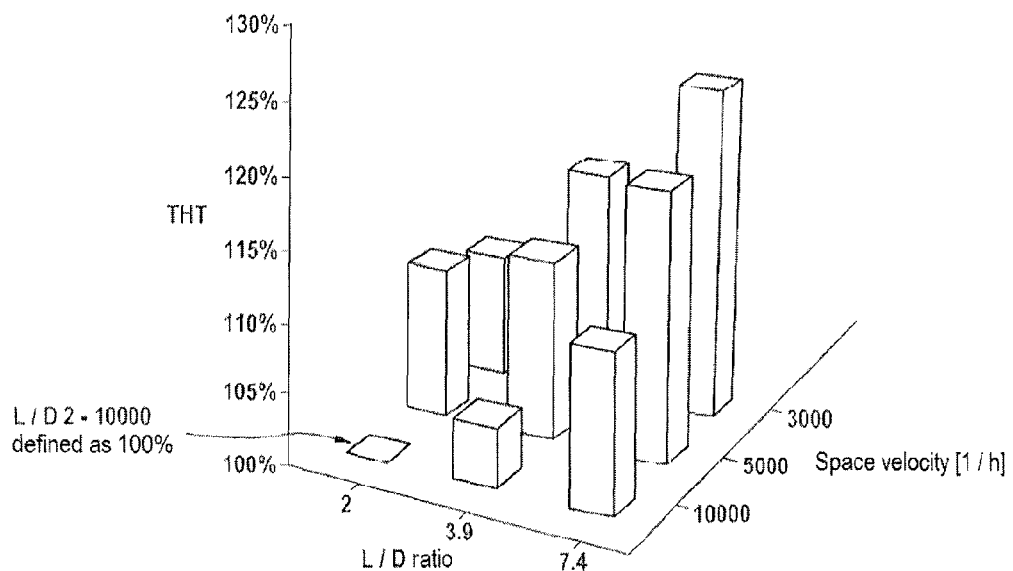
FIG. 6 a percentage scaling of the THT (tetrahydrothiophene) breakthrough capacity of Example 1 of WO2006/028686 relative to the space velocity and the L/D ratio.

FIG. 6 shows a pictorial representation of the influence of the space velocity as well as of the L/D ratio, wherein the breakthrough capacity of the L/D ratio of 2 and of the space velocity 10000 are each defined as 100%.

Thus it was able to be confirmed that higher breakthrough capacities result from higher L/D ratios. On the other hand, attention is to be paid to the overall height and the resulting pressure loss of the container of the cartridge, for which reason too long a container of the cartridge is not desired. It was able to be shown that an L/D ratio of approx. 4 represents a good compromise in the design of the cartridge.

Test 2

The aim of test 2 was to analyze the flow in the inlet area of the cartridge. For fluidic tests, a cylindrical cartridge prototype was made from clear plexiglass. This made it possible to visually assess flow-dynamic gas distributions. The internal diameter of the prototypes was 14, the length approx. 55 cm. The volume was approximately 8 liters. The cartridge had removable lids at both ends of the cylinder and were able to be opened and filled in this way. According to the invention connectors, in the present examples connectors from Viega, were screwed into the lids, into which corresponding gas pipes with gas lines attached thereto were introduced.

The inflow into the cartridge was made visible with the help of artificially produced mist. Various internal fittings were tested in order to check whether they exert a comparable effect on the flow.

The gas volume flow was adjusted with the help of a Brooks mass flow controller (MFC). For this the MFC was calibrated to the medium used, nitrogen 3.0, with the help of a DRYCAL throughflow meter from the manufacturer Westphal in the volume flow range between 70 and 600 standard liters per hour. Mist from a disco fog machine of type FOG-700 customary in the trade was added to the nitrogen stream via a T-piece. The gas/mist mixture entered the cartridge via the connections. A visual documentation was carried out using a HD camera which is fixed on a stand in front of the test unit. In order to increase the contrast, the cartridge was laminated on the back with sticky black flocked paper.

It was a requirement of the test that the mist blended in optimum manner in the gas medium and did not display settling behaviour. This was able to be confirmed by a test by filling the cartridge with mist and then stopping the gas stream. The mist then "floated" constantly and did not display settling behaviour.

A volume flow of 400 NL/h $N_2$ was set, which corresponds to a space velocity of approx. 50 NL/h/L. In the first test run, the inflow behaviour of the gas was observed for an inflow from top to bottom through an inert porous layer of rigid plastic foam which was provided in the container of the cartridge at a distance from the gas inlet opening. In contrast to this, in a second test run from bottom to top an inflow through an inert porous layer of rigid plastic foam of the same material as in the first test run which was provided in the cartridge at a distance from the gas inlet opening was carried out. It could clearly be seen that with an inflow from top to bottom the flow "shot through" more strongly, i.e. dispersed more unevenly in the container of the cartridge. An optimum and desired flow behaviour was to be observed with an inflow from bottom to top. Within only a few centimeters of the top of the container, a so-called plug flow, i.e. the formation of a plug-shaped mist cloud, formed at the base of the cartridge. A uniform loading of the adsorbent and thus an optimum utilization of the filling of the adsorbent is the result of such a flow behaviour.

The invention claimed is:

1. A device for the adsorption treatment of a fluid or fluid stream, comprising:
   a container for receiving adsorber material, wherein the container has a fluid inlet and a fluid outlet, and two fluid connection devices, wherein one of the fluid connection devices is provided at the fluid inlet and the other fluid connection device is provided at the fluid outlet, wherein the fluid connection devices are locked fluid-tight and are formed such that they can each be connected to a fluid line connection piece and unlocked, and on condition that they are connected to the respective fluid line connection piece, can be or are unlocked, wherein: the fluid connection devices each have a fluid throughflow duct and a moveable closure body, wherein the closure body closes the fluid throughflow duct fluid tight, wherein the fluid connection devices are formed such that the respective closure body is moved by connecting the fluid connection device to the fluid line connection piece and the fluid throughflow duct opens and/or is moved by detaching the fluid line connection piece, and closes the fluid throughflow duct, and a gas-tight connection of the gas pipe to the gas connector is produced; and wherein the fluid connection devices are formed such that the fluid line connection pieces are secured when the fluid connection devices are unlocked.

2. The device according to claim 1, wherein the unlocked fluid connection devices secure the fluid line connection pieces; and/or
   wherein the fluid connection devices are formed such that they can be manually or automatically locked by means of the respective fluid line connection pieces; and/or
   wherein at least one of the fluid connection devices is formed such that it can be successively or simultaneously connected to and unlocked from the respective fluid line connection piece.

3. The device according to claim 1, further comprising two fluid line connection pieces which are formed such that they can each be connected to one of the fluid connection devices and a fluid line.

4. The device according to claim 1, wherein the container contains one or more adsorber materials; and/or
the container contains one or more adsorber materials for desulfurizing liquid gas, gas, natural gas or other hydrocarbons; and/or
the container contains several adsorber materials and the adsorber materials are present in a mixed bed or as multi-component adsorber material.

5. The device according to claim 1, further comprising a thermally activating fluid shutoff apparatus and/or a fluid flow controller.

6. The device according to claim 1, wherein for reversible filling with the adsorber material the container comprises an opening and closing element which has a safety device to prevent manipulations by unauthorized persons, selected from: a cover for the opening and closing element and a special screw connection which can be opened exclusively by a special tool.

7. The device according to claim 1, wherein the container is formed such that it can be installed vertically and have, adjoining the fluid inlet, a cavity, or a cavity with a filling or bounding of porous and/or flexible inert material or plastic foam filling, for trapping condensate; and/or
wherein the device and/or the adsorber material used are formed such that they can be used at temperatures of from −10 to +90° C. and a pressure range of from −500 mbar over atmospheric pressure to +10 bar over atmospheric pressure.

8. The device according to claim 1, wherein the container has a feedstock length-to-feedstock diameter ratio of from 0.1 to 40; and/or
wherein a space velocity of <10.000 h$^{-1}$ relative to the total quantity of the adsorber material is set in the container; and/or
wherein the feedstock-to-particle diameter ratio is greater than 10.

9. The device according to claim 1, wherein the outer length of the container between the fluid inlet and the fluid outlet is in a range of from 700 to 800 mm or 729 mm.

10. The device according to claim 1, wherein the device including the fluid connection devices is in the range of from 850 mm to 900 mm, or 871 mm, long.

11. The device according to claim 1, wherein the container has an external diameter of 110 mm and/or an internal diameter of 90 mm.

12. The device according to claim 1, wherein the container is 717 mm long and a first opening selected from the fluid inlet and the fluid outlet comprises a tube piece 33 mm long; and/or
wherein a press connector is provided in the tube section and this is connected to the associated fluid connection device.

13. The device according to claim 1, wherein in a second opening selected from the fluid inlet and the fluid outlet a screw connection or bulkhead connection is provided; and/or
wherein the bulkhead connection extends the container by 6 mm.

14. The device according to claim 1, wherein the fluid connection devices each have a shape bent at a 90° angle; and/or wherein the fluid connection devices each have, at their respective free end, a connection opening for connection to the respective fluid line connection piece, wherein the distance between the centres of the connection openings is between 835 and 850 mm or is 839 mm.

15. A method of desulfurizing a combustion fluid, in particular natural gas or liquefied gas, for fuel cells, comprising subjecting a fluid or fluid stream to an adsorption treatment with the device according to claim 1.

16. A method for regenerating and/or disposing of, filling and/or installing a device for the adsorption treatment of a fluid or fluid stream according to claim 1, comprising at least one of the steps:
removing the device for the adsorption treatment of a fluid or fluid stream according to claim 1, the container of which contains adsorber material to be regenerated and/or disposed of, from an apparatus at or in which an adsorption treatment has been carried out, by detaching the fluid connection devices from the fluid line connection pieces which are connected to the apparatus;
transporting the container with the adsorber material to be regenerated and/or disposed of and locked fluid line connection pieces while the container is filled with fluid which has been treated or is to be treated; transporting the container with the adsorber material to be regenerated and/or disposed of and locked fluid connection devices to a regeneration and/or disposal station;
flushing the container which contains adsorber material to be regenerated and/or disposed of, with gas, protective gas, inert fluid, inert gas or air; emptying the container of the adsorber material to be regenerated and/or disposed of;
removing and/or regenerating the adsorber material to be regenerated and/or disposed of;
filling the container with regenerated or unused adsorber material;
flushing the container with protective gas, inert fluid, inert gas or the fluid which no longer contains an adsorbate to be removed by the adsorption treatment, during and/or after filling the container with the regenerated or unused adsorber material; carrying out a pressure and/or leak test to check the tightness of the filled container with locked fluid connection devices;
transporting the container with the regenerated or unused adsorber material and locked fluid connection devices while the container is filled with protective gas, inert fluid or inert gas;
transporting the container with the regenerated or unused adsorber material and locked fluid connection devices to an apparatus at or in which an adsorption treatment is to be carried out; connecting fluid line connection pieces to the apparatus at or in which an adsorption treatment is to be carried out;
installing the device for the adsorption treatment of a fluid or fluid stream according to claim 1 at or in an apparatus at or in which an adsorption treatment is to be carried out while the container is filled with regenerated or unused adsorber material and an element selected from protective gas, inert fluid, inert gas or the fluid which no longer contains an adsorbate to be removed by the adsorption treatment by connecting the fluid connection devices to fluid line connection pieces which are connected to the apparatus.

17. The method according to claim 16,
wherein the apparatus is a fuel cell or a gas compressor of a fuel cell; and/or wherein the device for the adsorption treatment of a fluid or fluid stream or the apparatus is an adsorbate detector or sulfur detector, and the regeneration and/or disposing of the device for the adsorption treatment of a fluid or fluid stream is carried out according to whether an adsorbate or sulfur compounds have been detected; and/or wherein the apparatus is provided with at least one shutoff valve which is installed in flow direction before or after the device for the adsorption treatment of a fluid or fluid stream.

18. A method for the adsorption treatment of a fluid or fluid stream, in particular for desulfurizing natural gas or liquefied gas for fuel cells, comprising: providing a device for the adsorption treatment of a fluid or fluid stream according to claim 1, wherein the container has been or is filled with an adsorber material for the adsorption treatment of a fluid or fluid stream,
- connecting a fluid feed pipe to a first fluid line connection piece and a fluid drainage pipe to a second fluid line connection piece,
- connecting the first and second fluid line connection piece to the two fluid connection devices of the device for the adsorption treatment of a fluid or fluid stream and thereby unlocking the fluid connection devices, and
- introducing a fluid in or passing a fluid through the device for the adsorption treatment of the fluid.

19. The method according to claim 18, wherein the fluid is passed vertically from bottom to top through the device for the adsorption treatment of a fluid or fluid stream.

20. The method according to claim 18,
- wherein the device for the adsorption treatment of a fluid or fluid stream is operated in combination with an adsorbate detector or sulfur detector and a replacement or a regeneration and/or disposing of the device is carried out according to whether an adsorbate or sulfur compounds have been detected; and/or
- wherein the device for the adsorption treatment of a fluid or fluid stream is operated in combination with a shutoff valve which is installed in flow direction in front of or after the container.

21. The method according to claim 18, wherein the fluid has a purity of <50 ppb residual sulfur after being passed through the device.

22. The method according to claim 18, wherein the fluid is passed through the device at temperatures of from −10 to +90° C. and a pressure in a pressure range of from −500 mbar over atmospheric pressure to +10 bar over atmospheric pressure.

23. The method according to claim 18, wherein the container has a feedstock length-to-feedstock diameter ratio of from 0.1 to 40; and/or
- wherein a space velocity of <10.000 h-1 relative to the total quantity of the adsorber material is set in the container; and/or
- wherein the feedstock-to-particle diameter ratio is greater than 10.

* * * * *